US012122277B2

(12) United States Patent
Akutsu et al.

(10) Patent No.: US 12,122,277 B2
(45) Date of Patent: Oct. 22, 2024

(54) CONVEYANCE SEAT AND PRODUCTION METHOD THEREFOR

(71) Applicant: TS TECH CO., LTD., Asaka (JP)

(72) Inventors: Shuichi Akutsu, Tochigi (JP); Kazuaki Mima, Tochigi (JP); Yuto Aoki, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 155 days.

(21) Appl. No.: 17/783,500

(22) PCT Filed: Dec. 11, 2020

(86) PCT No.: PCT/JP2020/046225
§ 371 (c)(1),
(2) Date: Jun. 8, 2022

(87) PCT Pub. No.: WO2021/117856
PCT Pub. Date: Jun. 17, 2021

(65) Prior Publication Data
US 2023/0009334 A1    Jan. 12, 2023

(30) Foreign Application Priority Data

Dec. 13, 2019  (JP) ................................ 2019-225807
Dec. 13, 2019  (JP) ................................ 2019-225808

(51) Int. Cl.
*B60N 2/64*   (2006.01)
(52) U.S. Cl.
CPC ..................................... *B60N 2/64* (2013.01)
(58) Field of Classification Search
CPC ..................................................... B60N 2/64
See application file for complete search history.

(56) References Cited

U.S. PATENT DOCUMENTS

2012/0133193 A1   5/2012  Abe et al.
2012/0256451 A1*  10/2012 Sahashi ................... B60N 2/66
                                                      297/180.14
(Continued)

FOREIGN PATENT DOCUMENTS

FR    3032013      7/2016
JP    S62079500    5/1987
(Continued)

OTHER PUBLICATIONS

Extended European Search Report for corresponding Application No. EP 20900384.7, dated Dec. 22, 2022, 8 pages.
(Continued)

*Primary Examiner* — Anthony D Barfield
(74) *Attorney, Agent, or Firm* — Dority & Manning, P.A.

(57) ABSTRACT

Provided is a conveyance seat in which a protruding portion of a pad in one seat member can be easily inserted between a frame and the other seat member. A conveyance seat includes two connected seat members, in which each of the two seat members includes a pad, a skin covering the pad, and a frame configuring a skeleton of the seat member, the pad of the one seat member has a protruding portion disposed between the frame of the one seat member and the other seat member at a part connected to the other seat member, and the skin of the one seat member has an extending portion extending by a predetermined distance from an end portion and covering a surface of the protruding portion and a grip portion gripping the protruding portion and covering a back surface of the protruding portion on a side connected to the other seat member.

10 Claims, 14 Drawing Sheets

(56) References Cited

U.S. PATENT DOCUMENTS

2012/0267937 A1  10/2012  Sahashi
2015/0203013 A1   7/2015  Akutsu et al.

FOREIGN PATENT DOCUMENTS

| JP | 2008296599 | 12/2008 | |
|----|------------|---------|---|
| JP | 2011142976 | 7/2011 | |
| JP | 2012116286 | 6/2012 | |
| JP | 2015030392 | 2/2015 | |
| JP | 2017214067 | 12/2017 | |
| JP | 2019182369 A * | 10/2019 | ............... B60N 2/64 |

OTHER PUBLICATIONS

PCT International Search Report (w/ English translation) for corresponding PCT Application No. PCT/JP2020/046225, mailed Feb. 22, 2021, 5 pages.

* cited by examiner

CONVEYANCE SEAT AND PRODUCTION METHOD THEREFOR

CROSS REFERENCE TO RELATED APPLICATIONS

This application is the U.S. National Stage entry of International Application No. PCT/JP2020/046225 filed under the Patent Cooperation Treaty on Dec. 11, 2020, which claims priority to Japanese Patent Application No. 2019-225807 filed on Dec. 13, 2019 and Japanese Patent Application No. 2019-225808 filed on Dec. 13, 2019, all of which are incorporated herein by reference.

TECHNICAL FIELD

The present invention relates to a conveyance seat and a method for manufacturing the conveyance seat, and more particularly to a conveyance seat provided with two connected seat members and a method for manufacturing the conveyance seat.

BACKGROUND ART

When a seat cushion having a skin is attached to a cushion frame, the rear end portion of the seat cushion is passed through the gap between a seat back and the rear pipe of the cushion frame (see Patent Literature 1).

CITATION LIST

Patent Literature

PATENT LITERATURE 1: JP 2017-214067 A

SUMMARY OF INVENTION

Technical Problem

However, because the size of the gap between the seat back and the rear pipe of the cushion frame is usually narrower than the height of the rear end portion of the seat cushion, when the rear end portion is passed through the gap, the rear end portion may hit the rear pipe and may not pass through the gap. Accordingly, in manufacturing a conveyance seat, a worker performs insertion work while pressing the rear end portion so as to avoid the hitting of the rear end portion, which leads to a problem in the form of a decline in workability.

The present invention has been made in view of the above problem, and an object of the present invention is to provide a conveyance seat and a conveyance seat manufacturing method allowing a protruding portion protruding from an end portion of a pad to be easily inserted between a frame as a skeleton and a seat member.

Solution to Problem

The above problem is solved by means of a conveyance seat of the present invention including two connected seat members, in which each of the two seat members includes a pad, a skin covering the pad, and a frame configuring a skeleton of the seat member, the pad of one of the seat members has a protruding portion disposed between the frame of the one seat member and the other seat member at a part connected to the other seat member, and the skin of the one seat member has an extending portion extending by a predetermined distance from an end portion and covering a surface of the protruding portion and a grip portion gripping the protruding portion and covering a back surface of the protruding portion on a side connected to the other seat member.

According to the conveyance seat of the present invention configured as described above, the protruding portion protruding from the end portion of the pad is covered with the extending portion and the grip portion. Accordingly, when the protruding portion is passed through a gap, the protruding portion hitting the frame is suppressed, and the protruding portion can be easily inserted between the frame and the pad of another seat member. Accordingly, the workability of conveyance seat assembly is improved.

In addition, in the above configuration, the one seat member may be a seat cushion where an occupant sits, and the other seat member may be a seat back connected to a rear end portion of the seat cushion and receiving the occupant's back, and the extending portion and the grip portion may extend from a rear end portion of the skin of the seat cushion and cover the protruding portion of the seat cushion.

With the above configuration, when the protruding portion at the rear end of the seat cushion is passed between the frame of the seat cushion and the seat back, the protruding portion hitting the frame, for example, a pipe member is suppressed, and the protruding portion can be easily passed between the frame and the seat cushion.

In addition, in the above configuration, a thickness of the extending portion may be thinner than a thickness of the skin.

By the extending portion that extends from the skin being thinner than the skin, the cost of manufacturing can be reduced even in the case of making the extending portion and the skin using the same material.

In addition, in the above configuration, both side portions of the extending portion and both side portions of the grip portion may be joined, the extending portion and the grip portion may form a tubular body, and the protruding portion may be disposed through an inner portion of the tubular body.

By passing the protruding portion through the inner portion of the tubular body formed by the extending portion and the grip portion, when the protruding portion is disposed between the frame and the other seat member, the protruding portion shifting in the width direction of the conveyance seat is suppressed, and the passage can be facilitated.

In addition, in the above configuration, the frame may have a pressure receiving portion supporting the pad, and an attachment portion fixed to the pressure receiving portion may be provided in the end portion of the skin.

By the end portion of the skin being provided with the attachment portion fixed to the pressure receiving portion, it is possible to facilitate the fixing of the pad.

In addition, in the above configuration, a claw portion may be formed on the frame or the pressure receiving portion, and the attachment portion of the skin may be hung on and fixed to the claw portion.

By the attachment portion being hung on and fixed to the claw portion, the attachment portion can be easily fixed to the frame or the pressure receiving portion.

In addition, in the above configuration, the attachment portion may have a wire member hung on a plurality of the claw portions formed on the frantic or the pressure receiving portion.

By hanging the wire member of the attachment portion on the claw portion, the cost is lower than that of, for example, the hook-shaped attachment portion of the related art, and the attachment portion can be easily fixed.

In addition, the above problem is solved by means of a method for manufacturing a conveyance seat of the present invention including two connected seat members, each of the two seat members including a pad, a skin covering the pad, and a frame configuring a skeleton of the seat member, the pad of one of the seat members having a protruding portion at a part connected to the other seat member, and the skin of the one seat member having an extending portion extending by a predetermined distance from an end portion and covering a surface of the protruding portion and a grip portion gripping the protruding portion and covering a back surface of the protruding portion on a side connected to the other seat member, the conveyance seat manufacturing method including a step of passing the protruding portion between the frame of the one seat member and the other seat member in a state where the protruding portion is covered with the extending portion and the grip portion.

According to the conveyance seat manufacturing method of the present invention, the protruding portion protruding from the pad is covered with the extending portion and the grip portion. Accordingly, the pad hitting the frame is suppressed, and the protruding portion can be easily inserted between the frame and another seat member. Accordingly, the workability of conveyance seat assembly is improved.

In addition, in the conveyance seat manufacturing method described above, the frame may have a pressure receiving portion supporting the pad and the conveyance seat manufacturing method may include a step of hanging an attachment portion provided in the end portion of the skin on a claw portion formed on the frame or the pressure receiving portion to fix the pad to the frame.

The pad can be easily fixed to the frame by hooking the attachment portion provided in the end portion of the skin on the claw portion formed on the frame or the pressure receiving portion.

Advantageous Effects of Invention

According to the conveyance seat of the present invention, the protruding portion protruding from the end portion of the pad is covered with the extending portion and the grip portion. Accordingly, the protruding portion hitting the frame is suppressed, and the protruding portion can be easily inserted between the frame and the pad of another seat member. Accordingly, the workability of conveyance seat assembly is improved.

With the above configuration, when the protruding portion at the rear end of the seat cushion is passed between the frame of the seat cushion and the seat back, the protruding portion hitting the frame, for example, a pipe member is suppressed, and the protruding portion can be easily passed between the frame and the seat cushion.

In addition, by the extending portion that extends from the skin being thinner than the skin, the cost of manufacturing can be reduced even in the case of making the extending portion and the skin using the same material.

In addition, by passing the protruding portion through the inner portion of the tubular body formed by the extending portion and the grip portion, when the protruding portion is disposed between the frame and the other seat member, the protruding portion shifting in the width direction of the conveyance seat is suppressed, and the passage can be facilitated.

In addition, by the end portion of the skin being provided with the attachment portion fixed to the pressure receiving portion, it is possible to facilitate the fixing of the pad.

In addition, by the attachment portion being hung on and fixed to the claw portion, the attachment portion can be easily fixed to the frame or the pressure receiving portion.

In addition, by hanging the wire member of the attachment portion on the claw portion, the cost is lower than that of, for example, the hook-shaped attachment portion of the related art, and the attachment portion can be easily fixed.

In addition, by the conveyance seat manufacturing method of the present invention, the protruding portion protruding from the pad is covered with the extending portion and the grip portion. Accordingly, the pad hitting the frame is suppressed, and the protruding portion can be easily inserted between the frame and another seat member. Accordingly, the workability of conveyance seat assembly is improved.

In addition, the pad can be easily fixed to the frame by hooking the attachment portion provided in the end portion of the skin on the claw portion formed on the frame or the pressure receiving portion.

DESCRIPTION OF EMBODIMENTS

First Embodiment

Hereinafter, the configuration of a conveyance seat according to an embodiment of the present invention (first embodiment) will be described with reference to the drawings. However, the embodiment described below is an example for facilitating the understanding of the present invention and does not limit the present invention. In other words, the present invention can be modified and improved without departing from the spirit thereof, and it is a matter of course that the present invention includes equivalents thereof.

It should be noted that in the following description, a vehicle seat will be given as an example of the conveyance seat and a configuration example thereof will be described. However, the present invention is not limited to a vehicle seat mounted in a ground-traveling wheeled conveyance such as an automobile and a railroad vehicle and may be a seat mounted in a non-ground conveyance such as an aircraft and a ship.

In addition, in the following description, the "front to back direction" is the front to back direction of the vehicle seat and coincides with the direction in which a vehicle travels. In addition, the "seat width direction" is the width direction of the vehicle seat and coincides with the right to left direction that is viewed from a seated occupant in the vehicle seat. In addition, the "up to down direction" is the up to down direction of the vehicle seat and, when the vehicle travels on a horizontal surface, coincides with the vertical direction.

In addition, in the following description, in a case where the term of "seat" is used in various directions as in the "seat width direction" and the "seat height direction", directions with respect to the vehicle seat are indicated and, in a case where the term of "vehicle" is used as in the "vehicle inside" and the "vehicle outside", directions with respect to the vehicle are indicated.

In addition, unless otherwise specified, the shape, position, posture, and so on of each portion of the vehicle seat described below are described assuming a case where the vehicle seat is in the seated state to be described later.

Basic Configuration of Vehicle Seat According to First Embodiment

Figure 1:
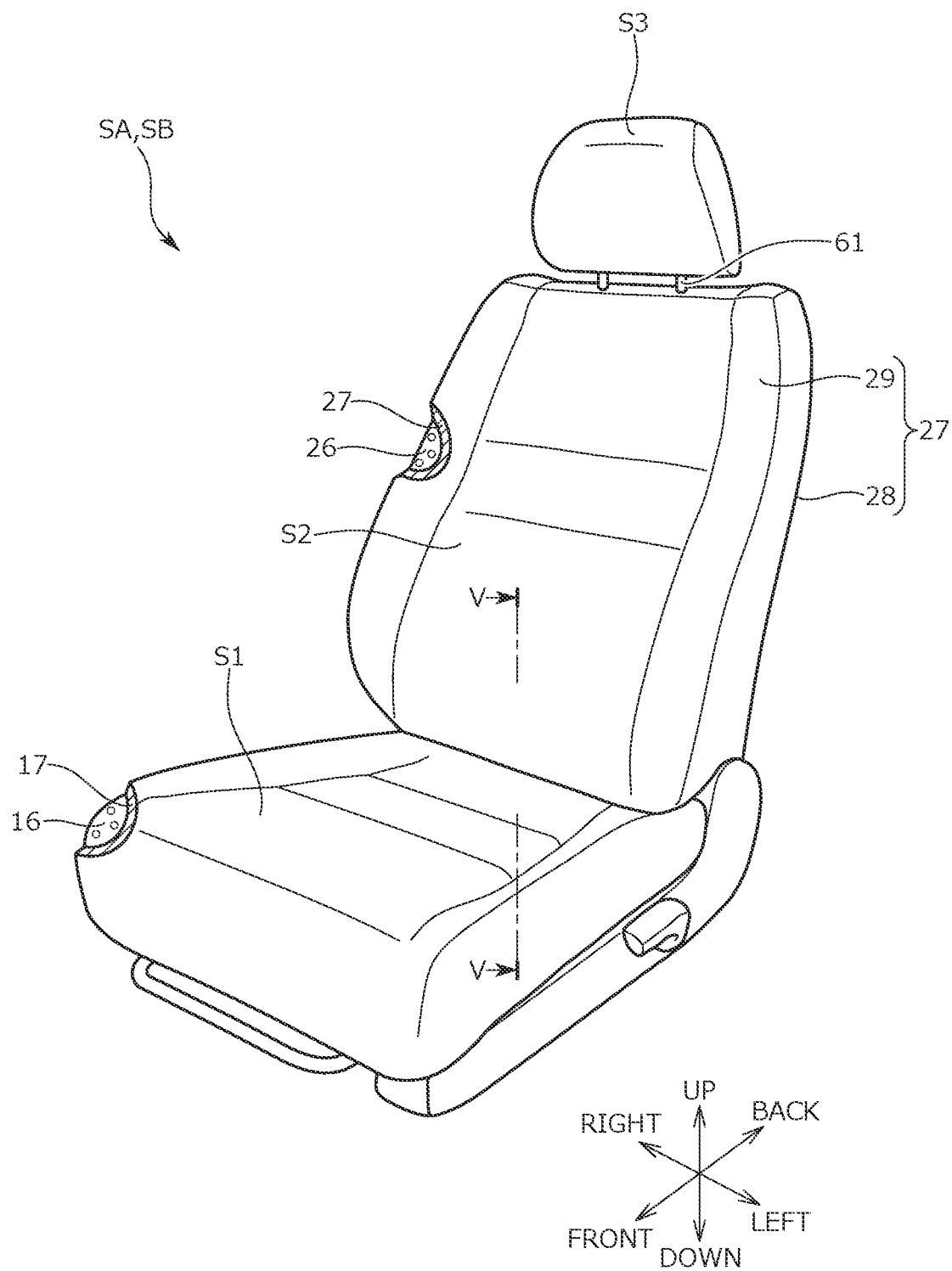
FIG. 1 is a perspective view of a vehicle seat according to an embodiment of the present invention.

The basic configuration of the vehicle seat according to the first embodiment (hereinafter, vehicle seat SA) will be described with reference to FIGS. 1 and 2. FIG. 1 is a perspective view of the vehicle seat SA. In FIG. 1, a part of the vehicle seat SA is illustrated in a configuration in which trim covers (cushion trim cover 17 and back trim cover 27) are removed for convenience of illustration.

The vehicle seat SA is a seat placed on a vehicle body floor for a vehicle occupant to sit. In the present embodiment, the vehicle seat SA is used as a front seat corresponding to a front seat of the vehicle. However, the present invention is not limited thereto, and the vehicle seat SA may be a vehicular rear seat. In addition, the vehicle seat SA can be used as a second-row middle seat or a third-row rear seat in a vehicle that has three rows of seats in the front to back direction.

As illustrated in FIG. 1, the main components of the vehicle seat SA are a seat cushion S1 as a seating part supporting the seated occupant's buttocks, a seat back S2 as a backrest part supporting the seated occupant's back, and a headrest S3 arranged on the upper portion of the seat back S2 and supporting the seated occupant's head. The seat cushion S1 corresponds to one seat member of the present invention, and the seat back S2 corresponds to the other seat member of the present invention. The seat cushion S1 and the seat back S2 are connected with a reclining mechanism 60 (see FIG. 2) interposed therebetween. In addition, although not illustrated, a slide rail is installed in the lower portion of the seat cushion S1. By this slide rail, the vehicle seat SA is placed on the vehicle body floor in a state of being slidable in the front to back direction.

Figure 2:
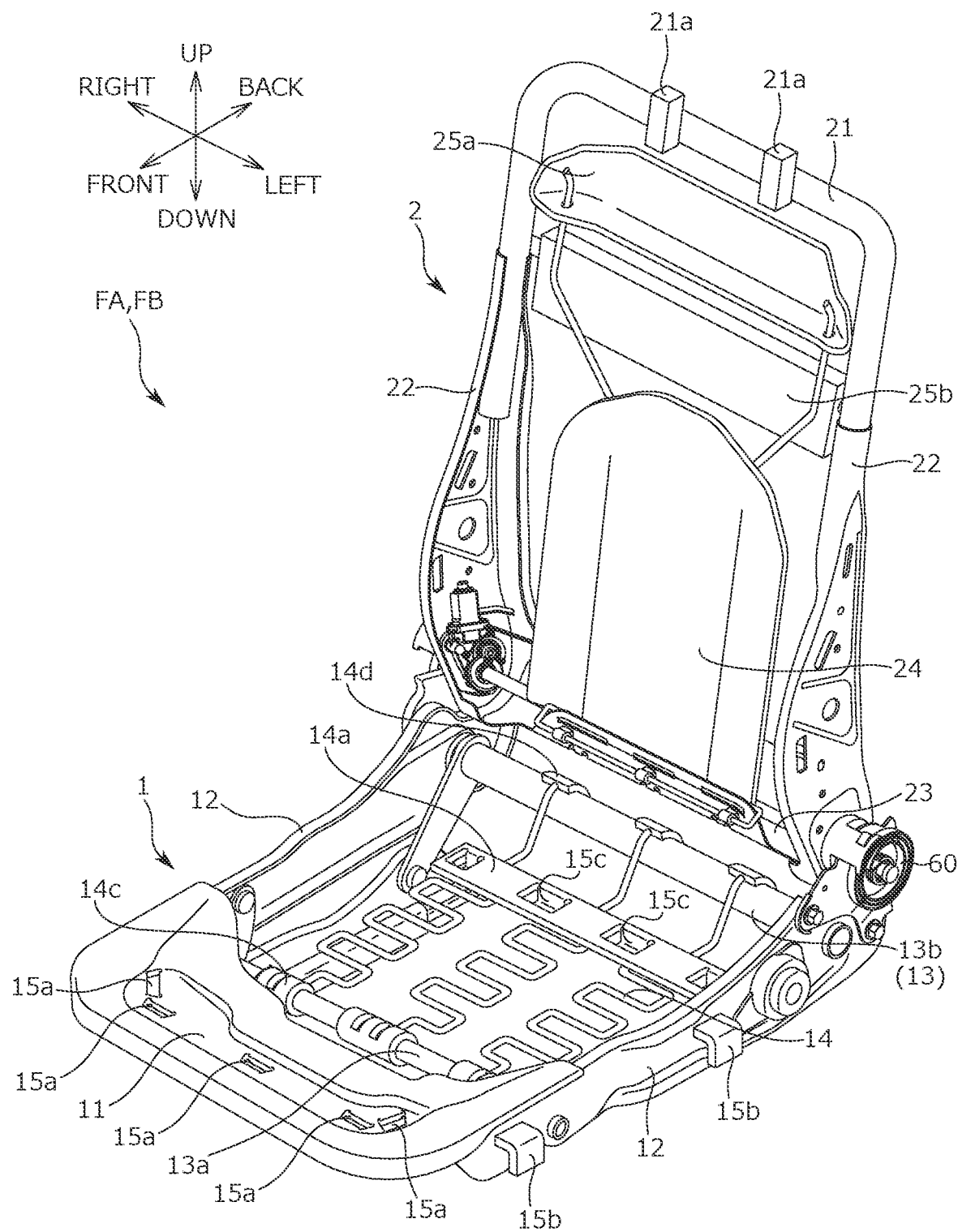
FIG. 2 is a perspective view illustrating a frame of the vehicle seat according to an embodiment of the present invention.

A seat frame FA illustrated in FIG. 2 is provided in the vehicle seat SA, and the seat frame FA is mainly configured by a cushion frame 1 and a back frame 2. The cushion frame 1 forms the skeleton of the seat cushion S1 in the seat frame FA, and the back frame 2 forms the skeleton of the seat back S2 the seat frame FA.

The rear end portion of the seat cushion S1 is connected to the lower end portion of the seat back S2. In addition, the seat cushion S1 is configured by placing a cushion pad 16 on the cushion frame 1 and further covering the cushion pad 16 with the cushion trim cover 17. The seat back S2 is configured by arranging a back pad 26 on the back frame 2 and further covering the back pad 26 with the back trim cover 27.

The cushion pad 16 and the back pad 26 are urethane base materials molded by foam molding using, for example, a urethane foaming agent. The cushion pad 16 and the back pad 26 correspond to the pads of the present invention. In addition, the cushion trim cover 17 and the back trim cover 27 correspond to the skin of the present invention, are made of cloth, film, leather, sheet, or the like, and are attached so as to cover the cushion pad 16 and the back pad 26 in a state of being stretched such that a predetermined tension is applied.

When the cushion trim cover 17 is stretched on the cushion pad 16 in the first embodiment, an end portion of the cushion trim cover 17 is attached to a predetermined part, and a method for the attachment will be described later.

In the first embodiment, the cushion frame 1 has a substantially square frame-shaped outer shape as illustrated in FIG. 2. The cushion frame 1 mainly includes a pair of cushion side frames 12 respectively configuring right and left end portions in the seat width direction, a pan frame 11 configuring the front end portion of the cushion frame 1, and a spring 14 (pressure receiving portion).

The two cushion side frames 12 are disposed so as to extend in the front to back direction of the vehicle and are separated from each other in the right to left direction in order to define the width of the cushion frame 1. A front pipe 13a connecting the two cushion side frames 12 is attached to the front end portion, and a rear pipe 13b is attached to the rear end portion.

In addition, the pan frame 11 is fixedly joined to the front side of the pair of cushion side frames 12, and the right and left cushion side frames 12 are connected to each other on the front side by the pan frame 11. More specifically, the end portions of the pan frame 11 in the right to left direction are respectively fixed to the flanges provided on the cushion side frames 12 by fixing means such as welding.

The pan frame 11 is mainly for supporting the thighs of a seated occupant (occupant). The pan frame 11 is a frame formed of a metallic plate material having a substantially flat upper surface and a substantially rectangular shape.

A plurality of the springs 14 (S springs) as pressure receiving portions are provided side by side in the seat width direction between the right and left cushion side frames 12. The spring 14 extends long in the front to back direction of the seat. The front end portion of the spring 14 is fixed to the front pipe 13a by an engagement hook 14c, and the rear end portion of the spring 14 is fastened to the rear pipe 13b by an engagement hook 14d. In addition, the spring 14 is provided with a pressure receiving plate 14a.

The back frame 2 mainly includes a pipe processed into a square frame shape. As illustrated in FIG. 2, the back frame 2 includes an inverted U-shaped upper frame 21, a pair of back side frames 22 forming right and left end portions in the seat width direction, and a lower frame 23 connecting the lower end portions of the pair of back side frames 22. In addition, the back frame 2 is provided with a pressure receiving plate 24 suspended from the back frame 2, and a suspension frame 25 for suspending the pressure receiving plate 24 is provided so as to extend over the right and left back side frames 22. A tubular headrest guide 21a is attached to the middle portion of the upper end of the back frame 2. The headrest S3 is attached to the seat back S2 by inserting a headrest pillar 61, which extends from the lower end of the headrest S3, into the headrest guide 21a.

Examples of the constituent material of each member configuring the cushion frame 1 include a material that is sufficient in terms of rigidity so as not to be significantly deformed when a load is applied. Examples of the material include a metal material such as a steel material and an aluminum alloy. Although the means for joining each member configuring the cushion frame 1 is welding, bolt or adhesive joining may be used in combination as joining means.

<<Cushion Pad and Cushion Trim Cover>>

Figure 3:
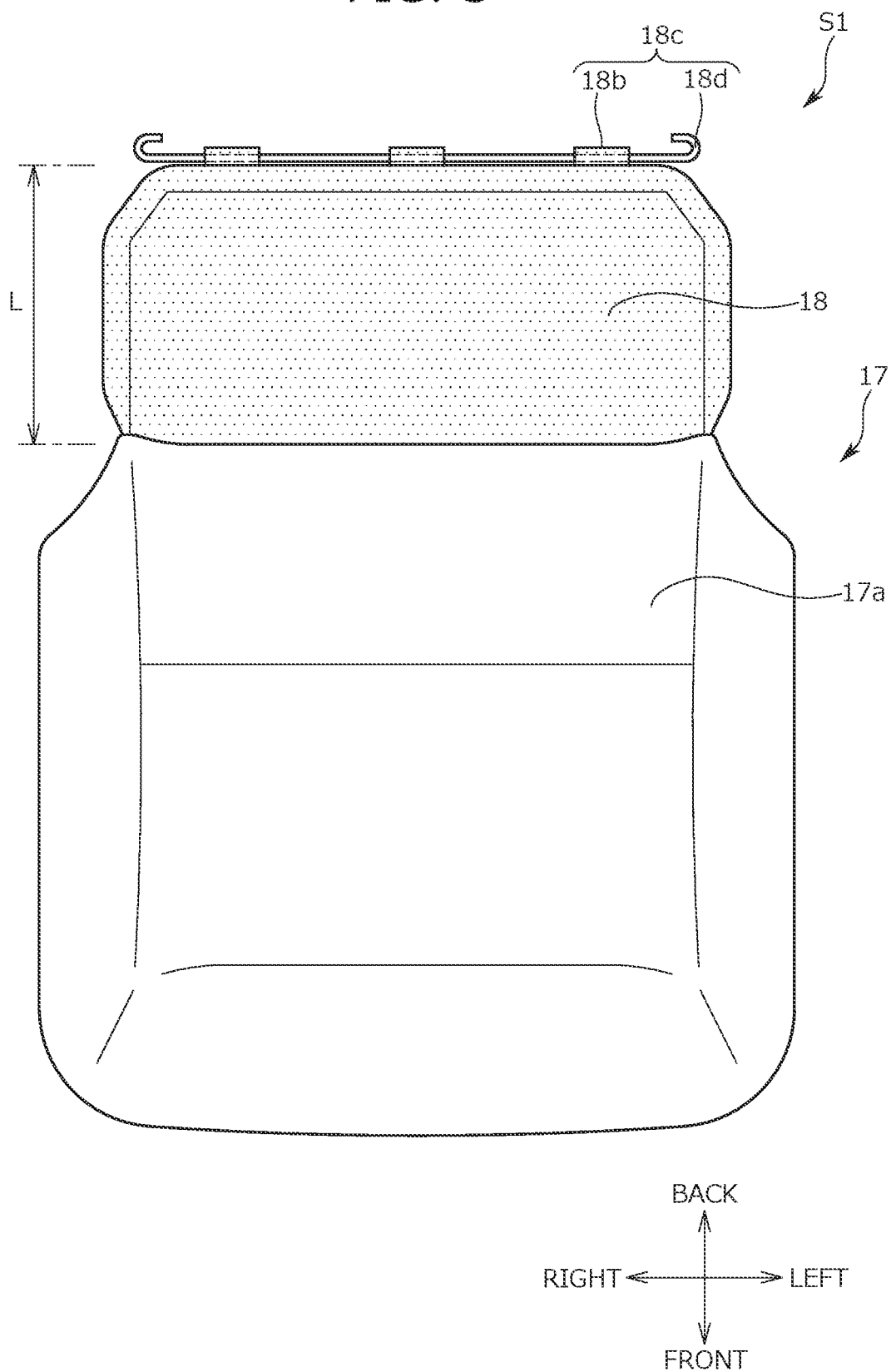
FIG. 3 is a plan view of a seat cushion of the vehicle seat.

Next, the configuration of the cushion pad 16 and the cushion trim cover 17 will be described with reference to FIGS. 3 to 5. In the following description, the "cushion front to back direction" is from the front end to the rear end of the seat cushion S1 and coincides with the front to back direction of the vehicle seat SA. The "front" in the front to back direction of the cushion means the side where the free end of the seat cushion S1 is positioned and the seat back S2 is not connected.

As described above, the cushion pad 16 is a member that is placed on the cushion frame 1 and receives an occupant's buttocks. In the seat cushion S1, the cushion pad 16 is provided so as to surround the cushion frame 1 as a frame. The cushion pad 16 is covered with the cushion trim cover 17 in order to be fixed to the cushion frame 1, and then inserted into a gap V between the seat back S2 and the rear pipe 13b of the cushion frame 1 (see FIG. 5). Accordingly, the cushion pad 16 has a protruding portion 16a inserted into the gap V in the rear end portion of the cushion pad 16. In other words, the cushion pad 16 has a protruding portion 16a disposed between the cushion frame 1 of the seat cushion S1 (more specifically, the rear pipe 13b) and the seat back S2 at the part where the seat cushion S1 and the seat back S2 are connected.

The cushion trim cover 17 is a member that covers the cushion pad 16 of the seat cushion S1 and has a cover main body 17a and an extending portion 18. The cover main body 17a covers the upper surface, the front surface, and both side surfaces of the cushion pad 16. As illustrated in FIG. 3, the extending portion 18 is provided in the rear end portion of the cushion trim cover 17, more specifically, in the rear end portion of the cover main body 17a so as to extend rearward by a predetermined distance L. The extending portion 18 covers the surface of the protruding portion 16a of the cushion pad 16.

Figure 5:
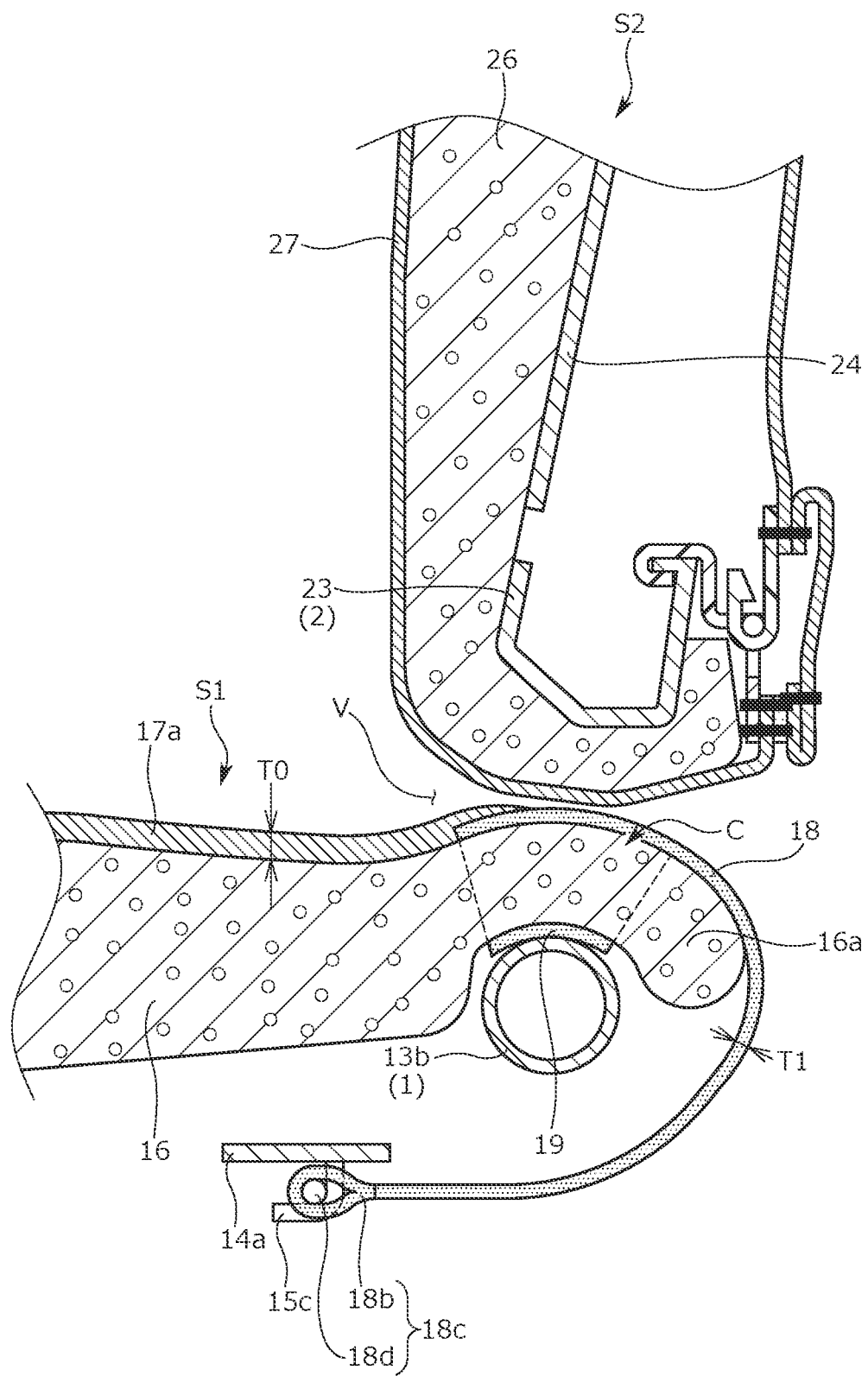
FIG. 5 is a cross-sectional view taken along line V-V of FIG. 1.

When the cushion pad 16 is attached to the cushion frame 1, the extending portion 18 is inserted into the gap V together with the protruding portion 16a, and the part beyond the rear pipe 13b is folded back and attached to the bottom surface side of the cushion pad 16 (see FIG. 5). More specifically, an attachment portion 18c is provided at the tip of the extending portion 18 and is attached to a claw portion 15c formed on the pressure receiving plate 14a of the spring 14.

Figure 4:
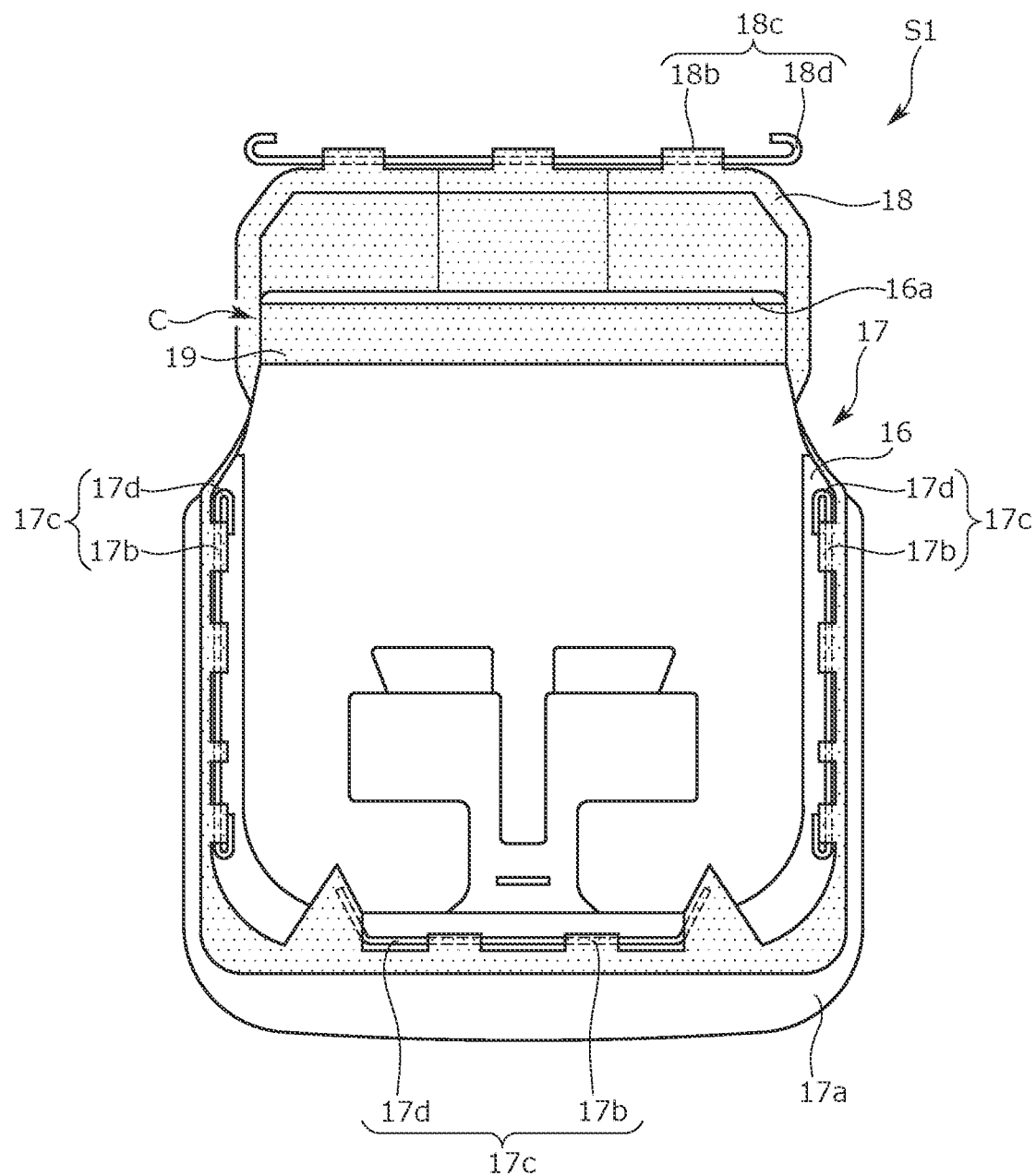
FIG. 4 is a bottom view of the seat cushion of the vehicle seat.
Figure 6:
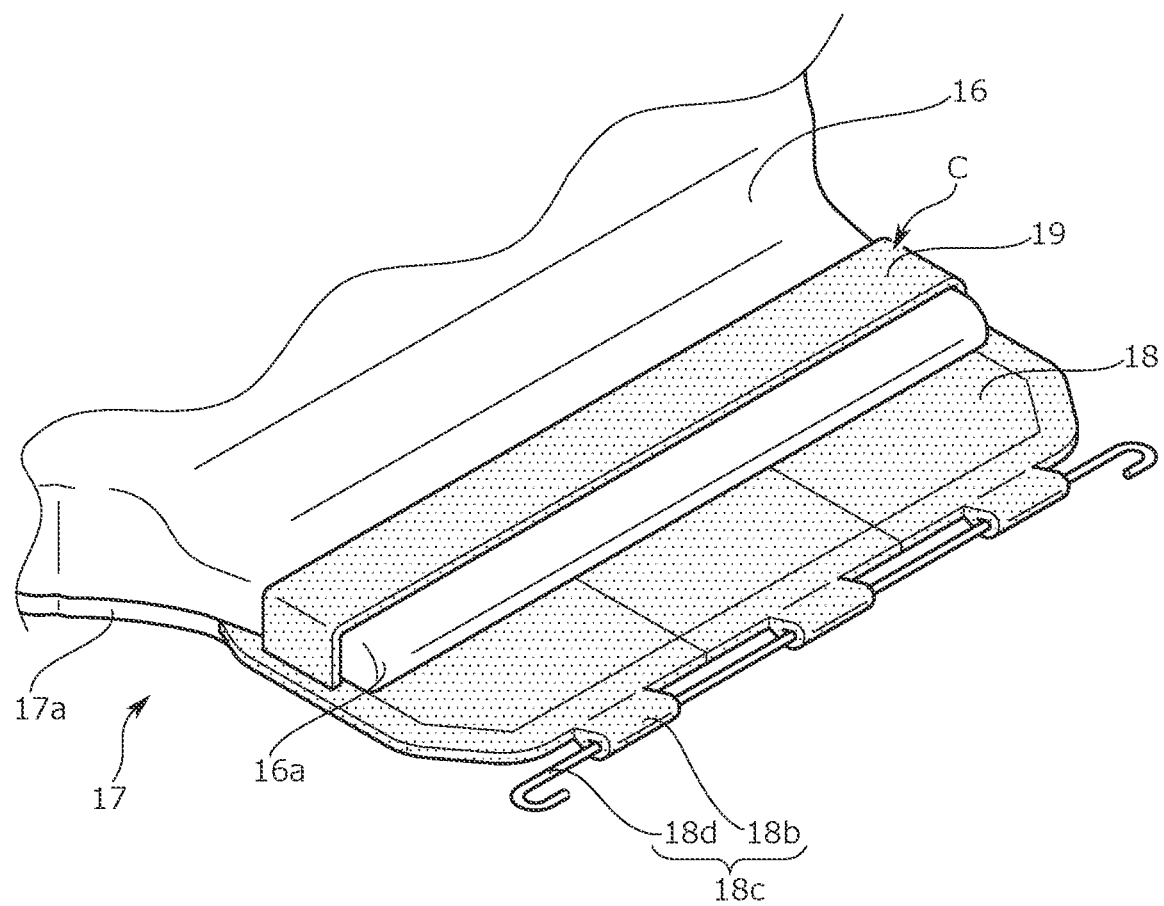
FIG. 6 is a perspective view illustrating a rear end portion of the seat cushion.

As illustrated in FIGS. 4 and 5, the cushion trim cover 17 has a grip portion 19 that grips the protruding portion 16a and covers the back surface of the protruding portion 16a on the back side of the extending portion 18. The extending portion 18 extends from the cover main body 17a and covers the surface of the protruding portion 16a. In addition, as illustrated in FIGS. 4 to 6, both side portions of the extending portion 18 and both side portions of the grip portion 19 are joined by sewing, and a tubular body C is formed by the extending portion 18 and the grip portion 19. The protruding portion 16a of the cushion pad 16 is disposed through the inner portion of the tubular body C.

In the related art, the cushion trim cover is not provided with the grip portion 19 gripping the protruding portion 16a. Accordingly, when the extending portion 18 and the protruding portion 16a are to pass through the gap V, the protruding portion 16a may hit the rear pipe 13b and the protruding portion 16a may not pass through the gap V even if the extending portion 18 is pulled. Accordingly, when the cushion pad 16 is attached, a worker presses the protruding portion 16a and inserts the extending portion 18 and the protruding portion 16a into the gap V with the thickness of the protruding portion 16a reduced. The workability is low since the protruding portion 16a is inserted while being pressed.

In the cushion trim cover 17 (one seat member) used in the vehicle seat SA of the first embodiment, the grip portion 19 grips the protruding portion 16a and covers the back surface, and thus the thickness of the protruding portion 16a is suppressed. Accordingly, in performing insertion into the gap V, a worker can easily insert the protruding portion 16a of the cushion pad 16 into the gap V beyond the rear pipe 13b, even without pressing the protruding portion 16a, simply by pulling the extending portion 18.

In addition, after inserting the protruding portion 16a into the gap V, the worker folds back the extending portion 18 with the rear pipe 13b and hangs the attachment portion 18c (wire member 18d) of an end portion 18b on the claw portion 15c provided on the back surface of the pressure receiving plate 14a of the spring 14. As a result, the cushion trim cover 17 and the cushion pad 16 can be attached to the cushion frame 1.

In the first embodiment, as illustrated in FIG. 5, a thickness T1 of the extending portion 10 is formed to be thinner than a thickness T0 of the cover main body 17a. By making the thickness T1 of the extending portion 18 thinner than the thickness T0 of the cover main body 17a, the cost of manufacturing can be reduced even in the case of making using the same material. In addition, when the extending portion 18 is passed through the gap the extending portion 18 that is thinner is easier to pass.

In addition, by the tubular body C being formed by the extending portion 18 and the grip portion 19 and the protruding portion 16a being passed through the inner portion of the tubular body C as described above, the protruding portion 16a moving in the seat width direction is suppressed and the protruding portion 16a can be easily passed through the gap V without shifting.

As illustrated in FIG. 4, front, right, and left end portions 17b of the cushion trim cover 17 are provided with attachment portions 17c for attaching the cushion trim cover 17 to the cushion frame 1. The attachment portion 17c is realized by holding a wire member 17d in the end portion 17b of the cushion trim cover 17. The attachment portions 17c are fired to the cushion frame 1 by hanging the wire members 17d exposed from the parts notched in the end portions 17b on claw portions 15a and 15b provided on the pair of cushion side frames 12 and the pan frame 11.

It is preferable to use a metallic or resinous wire that is, for example, rod-shaped, linear, or tubular as the wire member 17d. In addition, the diameter of the wire member 17d is preferably 1 to 8 mm and more preferably 1.5 to 5 mm.

The attachment portion 17c is stored with the wire member 17d passed through the end portion 17b of the cushion trim cover 17 and each end portion 17b folded back and sewn into a bag shape. Then, by hanging the wire members 17d corresponding to the positions of the claw portions 15a and 15b formed on the cushion side frames 12 and the pan frame 11, which will be described later, a predetermined tension is applied and the cushion trim cover 17 is fixed to the cushion pad 16.

Figure 7:
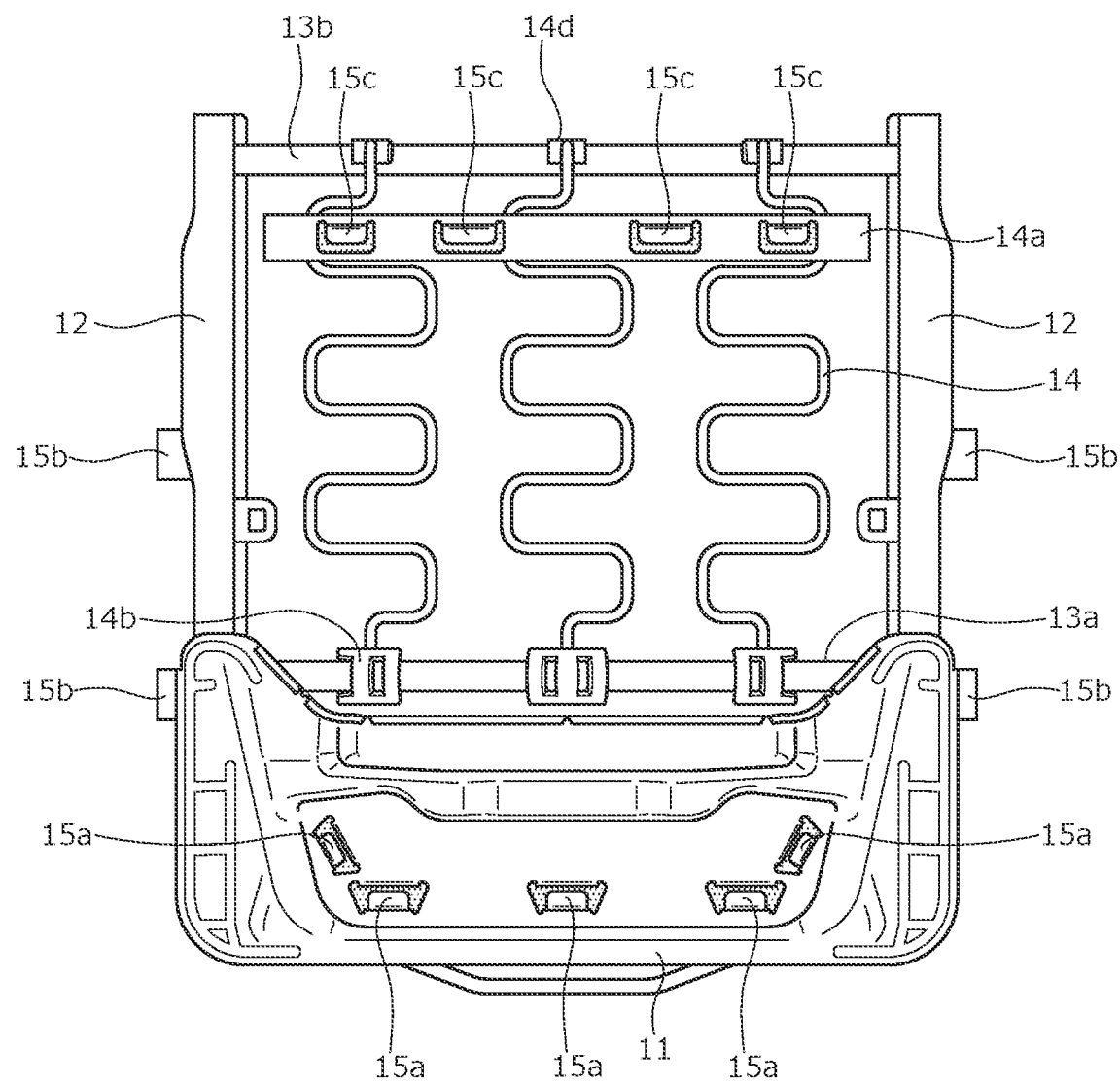
FIG. 7 is a plan view of a cushion frame.

As illustrated in FIG. 7, the plurality of claw portions 15a and 15b for fixing the attachment portion 17c of the cushion trim cover 17 described above are formed on the cushion frame 1. In the present embodiment, on the bottom surface of the pan frame 11, four claw portions 15a are formed by cutting up the claw portions having an L-shaped cross section, and the attachment portion 17c provided in the front end portion of the cushion trim cover 17 is hooked.

In addition, two claw portions 15b having an L-shaped cross section are attached by welding to each of the right and left cushion side frames 12. The attachment portions 17c provided in the right and left end portions of the cushion trim cover 17 hang on the claw portions 15b.

In addition, the claw portion 15c is formed by cutting up on the bottom surface of the pressure receiving plate 14a of the spring 14 provided in the cushion frame 1. The attachment portion 18c (wire member 18d) provided in the end portion 18b of the extending portion 18 folded back by the rear pipe 13b is hooked on the claw portion 15c.

The cushion pad 16 covered with the cushion trim cover 17 is placed on the cushion frame 1, the wire members 17d and 18d provided in the end portions 17b and 18b can be fixed by hanging on the claw portions 15a to 15c provided on the cushion frame 1, and thus the cushion pad 16 can be easily fixed to the cushion frame 1.

Figure 8:
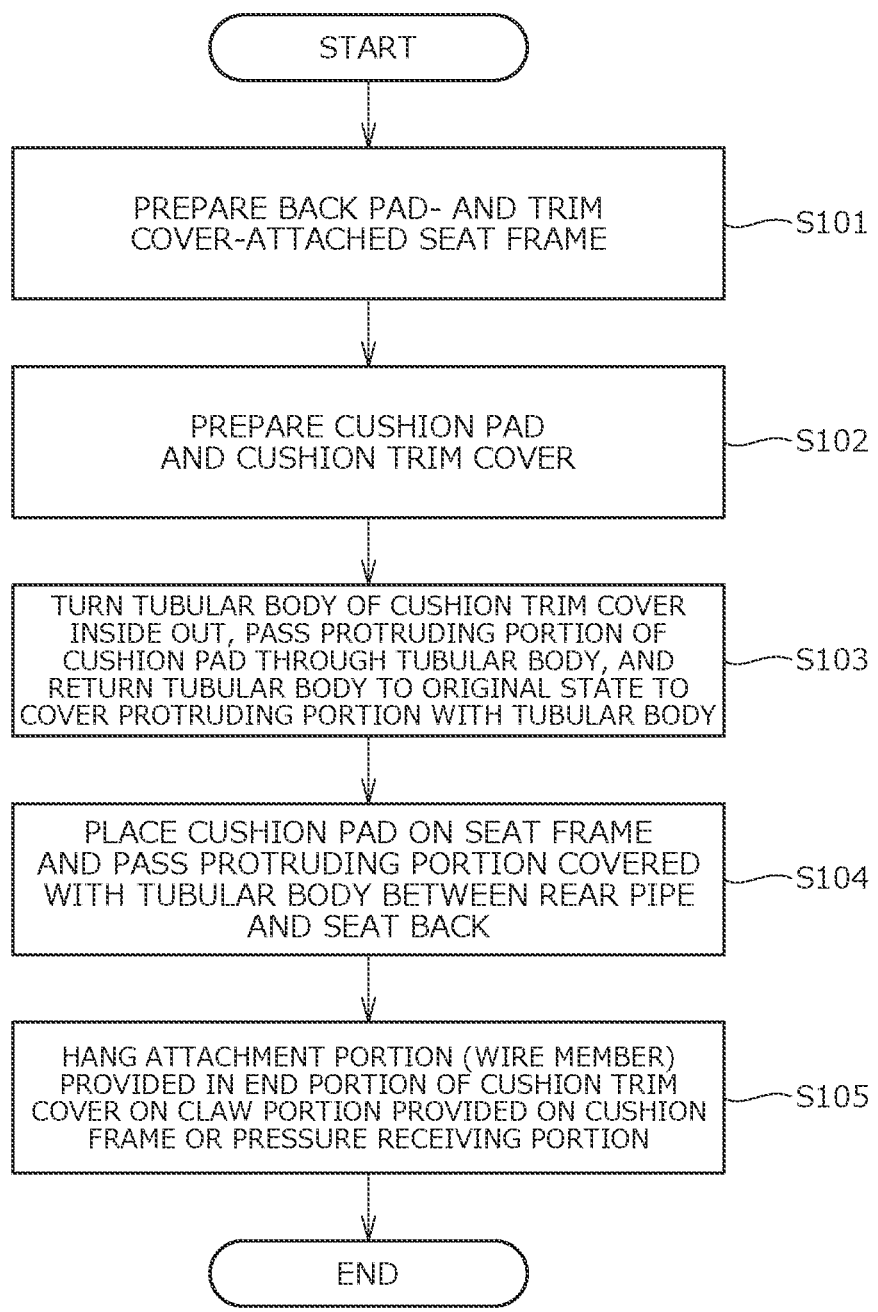
FIG. 8 is a flowchart illustrating a vehicle seat manufacturing method.

A method for manufacturing the vehicle seat SA of the first embodiment will be described with reference to FIG. 8. It is assumed that a seat frame FB illustrated in FIG. 2 is prepared in advance, the back pad 26 is disposed on the seat frame FB, and the back trim cover 27 covering the back pad 26 is attached (S101).

The cushion pad 16 having the protruding portion 16a at the rear end and the cushion trim cover 17 having the extending portion 18 and the grip portion 19 are prepared (S102). The tubular body C including the extending portion 18 and the grip portion 19 is turned inside out, the protruding portion 16a is passed through the tubular body C turned inside out, and then the tubular body C is returned to its original state and the protruding portion 16a is covered with the extending portion 18 and the grip portion 19 (S103).

The cushion pad 16 covered with the cushion trim cover 17 is placed on the cushion frame 1, and the protruding portion 16a of the cushion pad 16 and the extending portion 18 and the grip portion 19 covering the protruding portion 16a are passed between the rear pipe 13b and the seat back S2 (gap V) (S104). After the protruding portion 16a is sandwiched between the rear pipe 13b and the seat back S2, the extending portion 18 of the cushion trim cover 17 is folded back by the rear pipe 13b and the attachment portion 18c of the extending portion 18 is disposed in the bottom portion of the pressure receiving plate 14a.

Next, the wire members 17d and 18d of the attachment portions 17c and 18c provided in the end portions of the cushion trim cover 17 are hung on the claw portions 15a to 15c provided on the cushion frame 1 and the pressure receiving plate 14a of the spring 14. The cushion pad 16 covered with the cushion trim cover 17 is attached to the cushion frame 1, and the vehicle seat SA is completed (S105).

The conveyance seat and the conveyance seat manufacturing method according to the first embodiment have been described above with reference to the drawings. In the above example, the seat cushion S1 having the protruding portion 16a passing between the seat back S2 and the cushion frame 1 has been described. However, this is an example and the present invention may be applied to the seat back S2. In other words, a protruding portion that extends downward in the lower end portion of the back pad 26 of the seat back S2 may be provided and the protruding portion may be disposed between the lower frame 23 of the back frame 2 and the seat cushion S1. The protruding portion is covered with an extending portion extending from the lower end of the back trim cover and a grip portion. As a result, when the protruding portion of the seat back S2 is inserted, the protruding portion is not pressed, and the workability of assembly is improved.

Second Embodiment

The invention according to a second embodiment relates to a conveyance seat, and more particularly to a conveyance seat including an attachment member fixing the skin of the seat.

Background Art

In a conveyance seat, for skin attachment to the back pad of the seat back, a resinous hook is provided in a skin end portion, and the resinous hook is hooked and fixed to a predetermined attachment portion. The resinous hook of the related art is formed of a long resin plate and is continuously provided along a skin end portion. The long resinous hook is hooked while being pressed against a predetermined attachment portion. In addition, for example, the conveyance seat described in JP 2016-88370 (hereinafter, Patent Literature 2) has a structure in which a hooking tool provided in the lower end edge portion of a back surface skin is attached by insertion into the through hole of the trim cord provided on the other skin.

Problem to be Solved by Invention

In the conveyance seat described in Patent Literature 2, the width of the hooking tool and the width of the through hole are substantially the same. As a result, strictness in terms of work is required during attachment, and there is a problem in the form of unsatisfactory workability.

The present invention has been made in view of the above problem, and an object of the present invention is to provide a conveyance seat improved in terms of skin attachment workability.

Solution to Problem

The above problem is solved by means of a conveyance seat of the present invention including a seat member having a pad and a skin covering the pad. The conveyance seat includes an attachment member fixing an end portion of the skin and a hooking member having a hooking portion hooked on the attachment member and coupled to the end portion of the skin. The attachment member has a through hole into which the hooking portion is hooked, an opening portion of the through hole has a trapezoidal shape, and a second side facing a first side is larger in length than the first side of the through hole to which the hooking portion is locked.

According to the conveyance seat of the present invention configured as described above, the opening portion of the through hole into which the hooking portion is hooked has a trapezoidal shape, and the second side facing the first side is larger in length than the first side of the through hole to which the hooking portion is locked. As a result, the hooking portion is easily inserted into the through hole. Accordingly, strictness in terms of work is not required, and workability is improved.

In addition, in the above configuration, the length of the first side of the through hole may be substantially the same as the length of the part of the hooking portion that is locked to the first side.

Since the length of the first side of the through hole is substantially the same as the length of the part of the hooking portion that is locked to the first side, lateral shifting of the hooking portion is suppressed after the hooking portion is hooked on the attachment member, and the quality after assembling the conveyance seat is stable.

In addition, in the above configuration, the hooking member may have a plurality of the hooking portions, and the plurality of hooking portions may be disposed side by side along the direction that is parallel to the end portion of the skin.

By the plurality of hooking portions being arranged along the direction parallel to the end portion of the skin, the skin is pulled in uniformly, and the quality after the hooking member is attached to the attachment member is stable.

In addition, in the above configuration, the seat member may have a frame configuring a frame of the seat member, and the attachment member may include a holding portion holding the frame.

By the attachment member holding the frame, the position of the attachment member is fixed. Accordingly, the movement of the skin end portion is suppressed without the skin end portion floating, and the post-assembly quality of the conveyance seat is stable.

In addition, in the above configuration, the attachment member may have a plurality of the holding portions, and the plurality of holding portions may be disposed side by side along the direction that is parallel to the frame.

By the plurality of holding portions being arranged along the direction parallel to the frame, the position of the attachment member being inclined and shifted with respect to the frame is suppressed and, as a result, the quality is stable without the position of the end portion of the skin shifting.

In addition, in the above configuration, the attachment member may be a long flat plate-shaped member, and a laterally extending groove may be formed in the surface of the attachment member that faces the outside or the inside of the seat member.

By the laterally extending groove being formed in the surface of the attachment member that faces the outside or the inside, the attachment member is easily bent and, by bending the attachment member so as to be recessed to the inside of the conveyance seat, the skin attached to the attachment portion can be given a recessed surface shape, which is excellent in terms of production engineering.

In addition, in the above configuration, the hooking portion may have a claw portion inserted into the through hole, and the claw portion may be disposed toward the inside of the seat member.

By the claw portion being disposed toward the inside of the seat member, unevenness is suppressed in the appearance of the conveyance seat, the quality is stable, and the design is improved.

In addition, in the above configuration, a part of the back surface of the skin may be fixed to the end portion of the pad using a hook-and-loop fastener.

In the related art, the back surface of the skin is fixed by pulling to the inside of the seat member and hanging on the frame using a trim cord. On the other hand, by fixing a part of the back surface of the skin to the end portion of the pad using a hook-and-loop fastener, the skin can be easily fixed and the workability in assembling the conveyance seat is improved.

In addition, in the above configuration, the back surface of the skin may be provided with a bow-shaped wire pulling a part of the skin to the inside of the seat member.

In the related art, in order to give the skin a recessed surface shape recessed to the inside of the seat member, the attachment piece attached to the back surface of the skin is formed by pulling to the inside of the seat member and fixing to the frame using a trim cord. By providing the back surface of the skin with the bow-shaped wire that pulls a part of the skin to the inside of the seat member, a recessed surface shape can be easily formed and the workability in assembling the conveyance seat is improved.

In addition, in the above configuration, a flap may be provided to cover the attachment member and the hooking member.

By providing the flap that covers the attachment member and the hooking member, the attachment member and the hooking member are hard to see on the appearance of the conveyance seat, and the design of the conveyance seat is improved.

Effects of Invention

According to the conveyance seat of the present invention, the opening portion of the through hole into which the hooking portion is hooked has a trapezoidal shape, and the second side facing the first side is larger in length than the first side of the through hole to which the hooking portion is locked. As a result, the hooking portion is easily inserted into the through hole. Accordingly, strictness in terms of work is not required, and workability is improved.

In addition, since the length of the first side of the through hole is substantially the same as the length of the part of the hooking portion that is locked to the first side, lateral shifting is suppressed after the hooking portion is hooked on the attachment portion, and the quality after assembling the conveyance seat is stable.

In addition, by the plurality of hooking portions being arranged along the direction parallel to the end portion of the skin, the skin is pulled in uniformly, and the quality after the hooking member is attached to the attachment portion is stable.

In addition, by the attachment member holding the frame, the position of the attachment member is fixed. Accordingly, the position of the end portion of the skin attached to the attachment member does not shift, and the quality is stable.

In addition, by the plurality of holding portions being arranged along the direction parallel to the frame, the position of the attachment member is stable and, as a result, the quality is stable without the position of the end portion of the skin shifting.

In addition, by the laterally extending groove being formed in the surface of the attachment member that faces the outside or the inside, the attachment member is easily bent and, by bending the attachment member so as to be recessed to the inside of the conveyance seat, the skin attached to the attachment portion can be given a recessed surface shape, which is excellent in terms of production engineering.

In addition, by the claw portion being disposed toward the inside of the seat member, unevenness is suppressed in the appearance of the conveyance seat, the quality is stable, and the design is improved.

In addition, by fixing a part of the back surface of the skin to the end portion of the pad using a hook-and-loop fastener, the skin can be easily fixed and the workability in assembling the conveyance seat is improved.

In addition, by providing the back surface of the skin with the bow-shaped wire that pulls a part of the skin to the inside of the seat member, a recessed surface shape can be easily formed and the workability in assembling the conveyance seat is improved.

In addition, by providing the flap that covers the attachment member and the hooking member, the attachment member and the hooking member are hard to see on the appearance of the conveyance seat, and the design of the conveyance seat is improved.

Mode for Carrying Out Invention

Hereinafter, the configuration of a conveyance seat according to an embodiment of the present invention (second embodiment) will be described with reference to the drawings. However, the embodiment described below is an example for facilitating the understanding of the present invention and does not limit the present invention. In other words, the present invention can be modified and improved without departing from the spirit thereof, and it is a matter of course that the present invention includes equivalents thereof.

It should be noted that in the following description, a vehicle seat will be given as an example of the conveyance seat and a configuration example thereof will be described as in the case of the first embodiment. However, the present invention is not limited to a vehicle seat mounted in a ground-traveling wheeled conveyance such as an automobile and a railroad vehicle and may be a seat mounted in a non-ground conveyance such as an aircraft and a ship.

In the description of the second embodiment as well as first embodiment, the "front to back direction" is the front to back direction of the vehicle seat and coincides with the direction in which a vehicle travels. In addition, the "seat width direction" is the width direction of the vehicle seat and coincides with the right to left direction that is viewed from a seated occupant in the vehicle seat. In addition, the "up to down direction" is the up to down direction of the vehicle seat and, when the vehicle travels on a horizontal surface, coincides with the vertical direction.

In addition, in the following description, in a case where the term of "seat" is used in various directions as in the "seat width direction" and the "seat height direction", directions with respect to the vehicle seat are indicated and, in a case where the term of "vehicle" is used as in the "vehicle inside" and the "vehicle outside", directions with respect to the vehicle are indicated.

In addition, unless otherwise specified, the shape, position, posture, and so on of each portion of the vehicle seat described below are described assuming a case where the vehicle seat is in a seatable state.

Basic Configuration of Vehicle Seat According to Second Embodiment

The basic configuration of the vehicle seat according to the second embodiment (hereinafter, vehicle seat SB) will be described with reference to FIGS. 1, 2, 9, and 10. FIG. 1 is a perspective view in which the vehicle seat SB is diagonally viewed from the front. In FIG. 1, a part of the vehicle seat SB is illustrated in a configuration in which trim covers (cushion trim cover 17 and back trim cover 27) are removed for convenience of illustration.

The vehicle seat SB is a seat placed on a vehicle body floor for a vehicle occupant to sit. In the second embodiment, the vehicle seat SB is used as a front seat corresponding to a front seat of the vehicle. However, the present invention is not limited thereto, and the vehicle seat SB may be a vehicular rear seat. In addition, the vehicle seat SB can be used as a second-row middle seat or a third-row rear seat in a vehicle that has three rows of seats in the front to back direction.

As illustrated in FIG. 1, the main components of the vehicle seat SB are a seat cushion S1 as a seating part supporting the seated occupant's buttocks, a seat back S2 as a backrest part supporting the seated occupant's back, and a headrest S3 arranged on the upper portion of the seat back S2 and supporting the seated occupant's head. It should be noted that the seat cushion S1 and the seat back S2 correspond to the seat members of the present invention. The seat cushion S1 and the seat back S2 are connected with a reclining mechanism 60 interposed therebetween. In addition, although not illustrated, a slide rail is installed in the lower portion of the seat cushion S1. By this slide rail, the vehicle seat SB is placed on the vehicle body floor in a state of being slidable in the front to back direction.

As in the case of the first embodiment, a seat frame FB illustrated in FIG. 2 is provided in the vehicle seat SB, and the seat frame FB is mainly configured by a cushion frame 1 and a back frame 2. The cushion frame 1 forms the skeleton of the seat cushion S1 in the seat frame FB, and the back frame 2 forms the skeleton of the seat back S2 in the seat frame FB.

The rear end portion of the seat cushion S1 is connected to the lower end portion of the seat back S2. In addition, the seat cushion S1 is configured by placing a cushion pad 16 on the cushion frame 1 and further covering the cushion pad 16 with the cushion trim cover 17. The seat back 52 is configured by arranging a back pad 26 on the back frame 2 and further covering the back pad 26 with the back trim cover 27.

Figure 9:
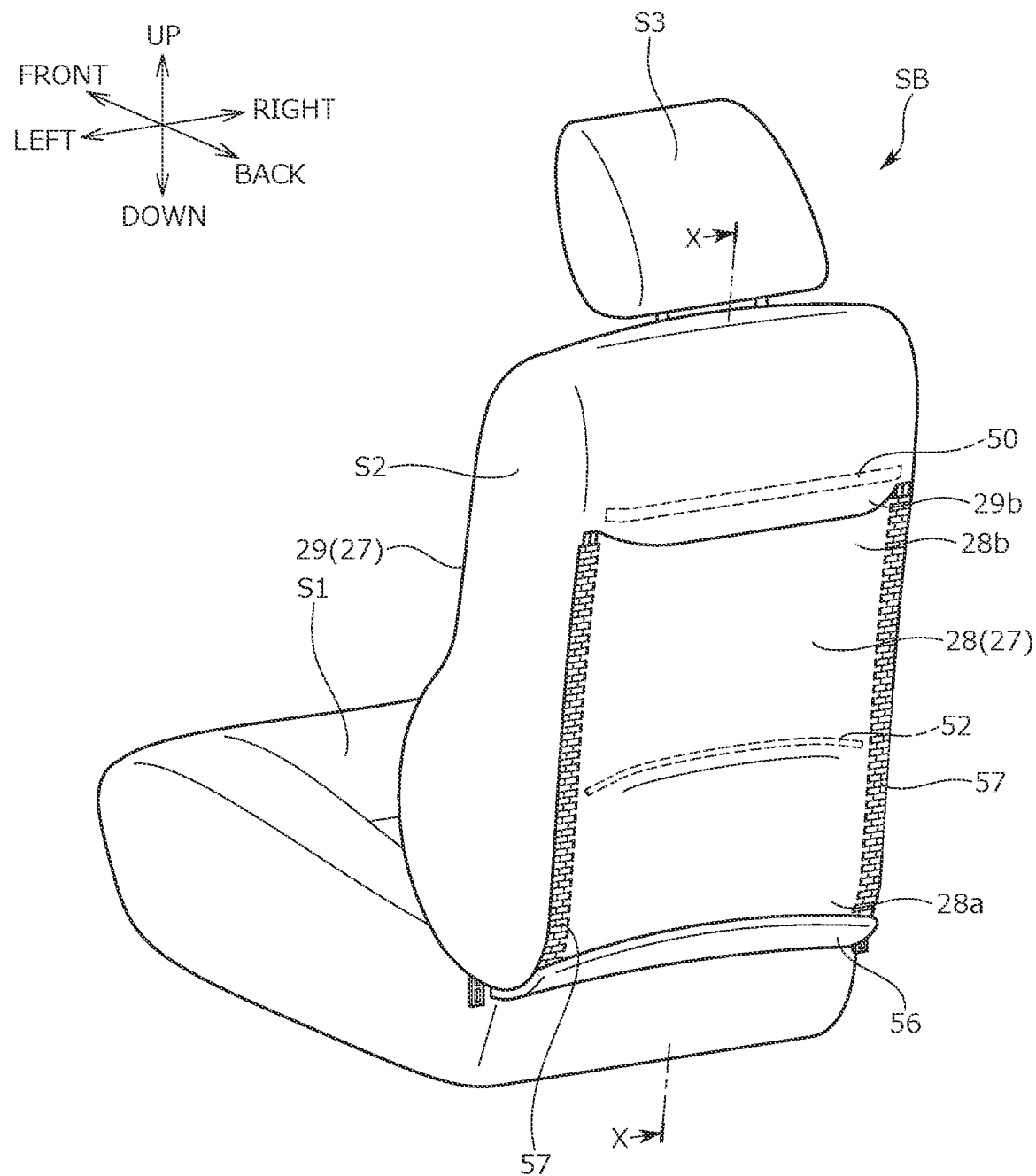
FIG. 9 is a perspective view in which the vehicle seat is diagonally viewed from behind.
Figure 10:
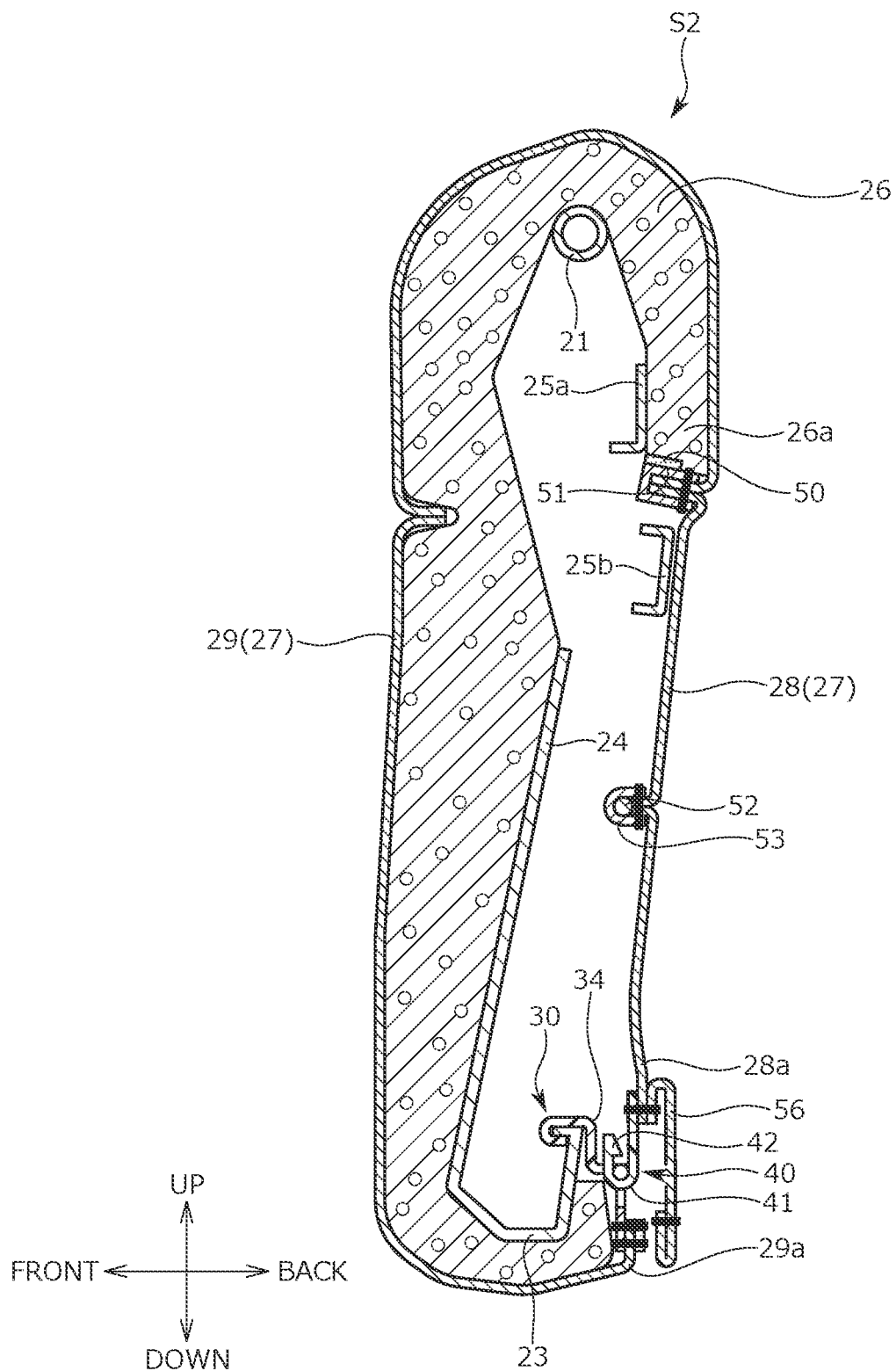
FIG. 10 is a cross-sectional view of a seat back taken along line X-X of FIG. 9.

As illustrated in FIGS. 1 and 9, the back trim cover 27 includes a back surface skin material 28 that covers the back surface of the back pad 26 and a front surface skin material 29 that covers the front surface, both side surfaces, and the like of the back pad 26. As illustrated in FIG. 10, a lower end portion 29*a* of the front surface skin material 29 is disposed at the lower end of the seat back S2 under the gap between the seat cushion S1 and the seat back S2 and is configured to be connected to a lower end portion 28*a* of the back surface skin material 28. The back trim cover 27 corresponds to the skin of the present invention.

The cushion pad 16 and the back pad 26 are urethane base materials molded by foam molding using, for example, a urethane foaming agent. In addition, the cushion trim cover 17 and the back trim cover 27 correspond to the skin of the present invention, are made of cloth, film, leather, sheet, or the like, and are attached so as to cover the cushion pad 16 and the back pad 26 in a state of being stretched such that a predetermined tension is applied.

When the back trim cover 27 is stretched on the back pad 26 in the second embodiment, an end portion of the back trim cover 27 is attached to a predetermined part, and a method for the attachment will be described later.

The cushion frame 1 is supported by a leg portion (not illustrated), an upper rail is attached to this leg portion, and slide-type assembly is performed in which position adjustment is possible in the front to back direction between the upper rail and the lower rail that is installed on the vehicle body floor. The rear end portion of the cushion frame 1 is connected to the back frame 2 via the reclining mechanism 60.

In the second embodiment, the cushion frame 1 has a substantially square frame-shaped outer shape as illustrated in FIG. 2. The cushion frame 1 mainly includes a pair of cushion side frames 12 respectively configuring right and left end portions in the seat width direction, a pan frame 11 configuring the front end portion of the cushion frame 1, a connecting pipe 13 connecting the right and left cushion side frames 12 in the rear end portion, and a spring 14 (pressure receiving portion).

The back frame 2 mainly includes a pipe processed into a square frame shape. As illustrated in FIG. 2, the back frame 2 includes an inverted U-shaped upper frame 21, a par of back side frames 22 forming right and left end portions in the seat width direction, and a lower frame 23 connecting the lower end portions of the pair of back side frames 22. In addition, the back frame 2 is provided with a pressure receiving plate 24 suspended from the back frame 2, and a suspension frame 25a for suspending the pressure receiving plate 24 is provided so as to extend over the right and left back side frames 22. In addition, a connecting frame 25b is provided to connect and support the parts of the upper frame 21 that extend in the up to down direction. Two headrest guides 21a are provided in the middle of the upper end of the upper frame 21, and a headrest pillar 61 extending from the headrest S3 can be inserted and held.

Examples of the constituent material of each member configuring the cushion frame 1 and the back frame 2 include a material that is sufficient in terms of rigidity so as not to be significantly deformed when a load is applied. Examples of the material include a metal material such as a steel material and an aluminum alloy. Although the means for joining each member configuring the cushion frame 1 and the back frame 2 is welding, bolt or adhesive joining may be used in combination as joining means.

<<Back Pad and Back Trim Cover>>

Next, the configuration of the back trim cover 27 that covers the back pad 26 will be described with reference to FIGS. 9 to 14. In the following description, the "seat back up to down direction" is from the upper end to the lower end of the seat back 32 and coincides with the up to down direction of the vehicle seat SB. The "down" in the up to down direction of the seat back 32 means the side connected to the seat cushion S1, and the "up" means the side where the headrest S3 is positioned.

As described above, the back pad 26 is a member attached to the back frame 2 and supporting an occupant's back. In the seat back S2, the back pad 26 is provided so as to surround the back frame 2 as a frame (see FIG. 10).

The back trim cover 27 is a member that covers the back pad 26 of the seat back 32. The back trim cover 27 includes the front surface skin material 29 covering the front surface of the back pad 26, both side surfaces of the back pad 26, and a part of the rear surface of the back pad 26 and the back surface skin material 28 covering the opening part that is formed on the back surface side of the back pad 26. An upper end portion 28b of the back surface skin material 28 and an upper end portion 29b of the front surface skin material 29 are joined by sewing to form a joint portion 51. In addition, as illustrated in FIG. 3, both side portions of the back surface skin material 28 are coupled to the side portions of the front surface skin material 29 by a line fastener 57. In addition, the lower end portion 29a of the back surface skin material 28 is detachably fixed to an attachment member 30 to be described later. By unfixing the attachment member 30 and decoupling the line fastener 57, the back surface of the seat back 32 can be opened as illustrated in FIG. 5.

In addition, although a number of vehicle seats of the related art have a flat back surface, the back surface of the vehicle seat SB of the second embodiment (more specifically, the back surface skin material 28) is formed in a recessed surface shape recessed to the inside of the seat as illustrated in FIG. 9. By the back surface having the recessed surface shape, the leg space of, for example, an occupant sitting behind can be further widened.

<<Attachment Member and Hooking Member>>

Figure 13:
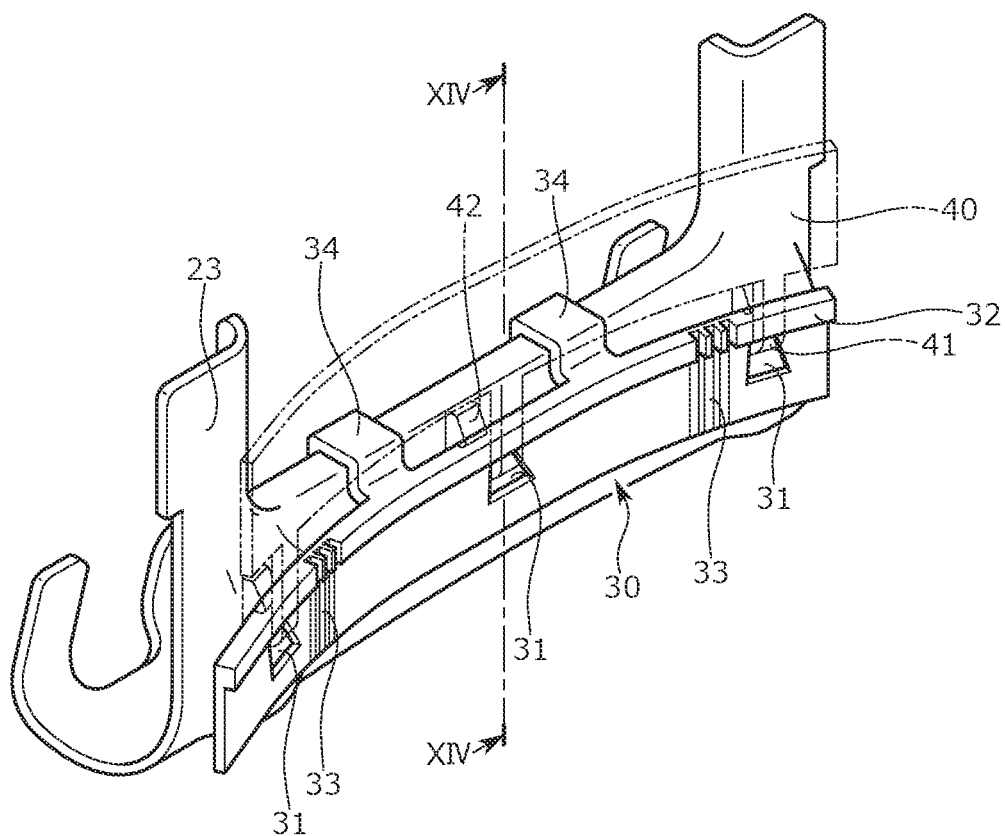
FIG. 13 is a perspective view illustrating a state where the attachment member is attached to a lower frame of the seat back.
Figure 13:
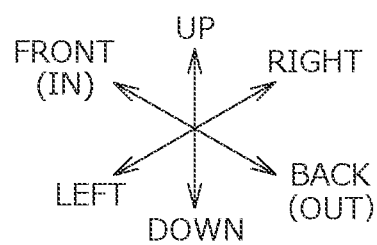

The back trim cover 27 of the vehicle seat SB of the second embodiment includes a hooking member 40, and the hooking member 40 has a hooking portion 41 formed in a J-shaped cross section and is coupled to the lower end portion 28a of the back surface skin material 28. In addition, the vehicle seat SB includes the attachment member 30 fixing the lower end portion 28a of the back surface skin material 28 via the hooking member 40. As illustrated in FIG. 13, the attachment member 30 is a long flat plate-shaped member, and the upper end portion of the attachment member 30 is provided with two holding portions 34 formed in a hook shape. The attachment member 30 holds the upper end of the lower frame 23 of the back frame 2 configuring the frame of the seat back S2 by the two holding portions 34, and the attachment member 30 is fixed to the lower end of the seat back S2. The lower end portion 29a of the front surface skin material 29 is coupled by sewing to the lower end portion of the attachment member 30.

The attachment member 30 has a through hole 31 which the hooking portion 41 is hooked at a position corresponding to the hooking portion 41 of the hooking member 40. The opening portion of the through hole 31 is formed in a trapezoidal shape, and a length L2 of a lower side 31b (second side) facing an upper side 31a is larger than a length L1 of the upper side 31a (first side) of the through hole 31 to which the hooking portion 41 is locked. In addition, a length L3 (length in the width direction) of the part of the hooking portion 41 that is locked to the upper side 31a of the through hole 31 and the length L1 of the upper side 31a of the through hole 31 are formed to have substantially the same size. The upper and lower sides of the opening portion of the through hole formed in the attachment portion of the related art are rectangles of the same size, and thus strictness is required and workability is not satisfactory in hooking the hooking portion 41. By the opening portion having a trapezoidal shape as in the case of the through hole 31 formed in the attachment member 30 of the present embodiment, the hooking portion 41 can be easily inserted into the through hole 31 in hooking, and workability is improved. In addition, by the width-direction length L3 of the hooking portion 41 and the length L1 of the upper side 31a of the through hole 31 being substantially the same, lateral shifting of the hooking portion 41 is suppressed even after the hooking portion 41 is hung on the attachment member 30, and the post-assembly quality is stable.

Figure 11:
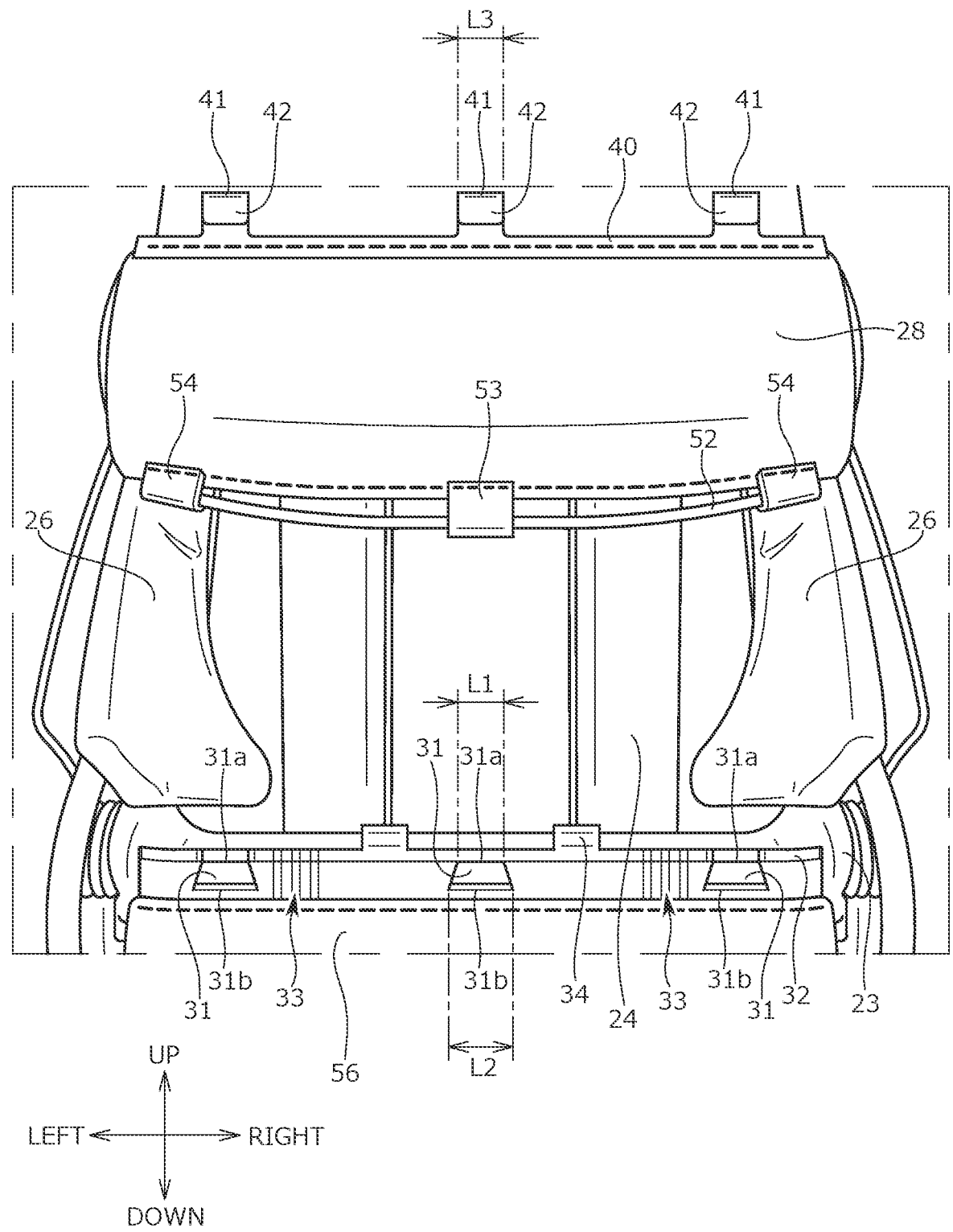
FIG. 11 is a diagram illustrating the inner portion of the seat back with a part of a back surface skin material open.
Figure 12:
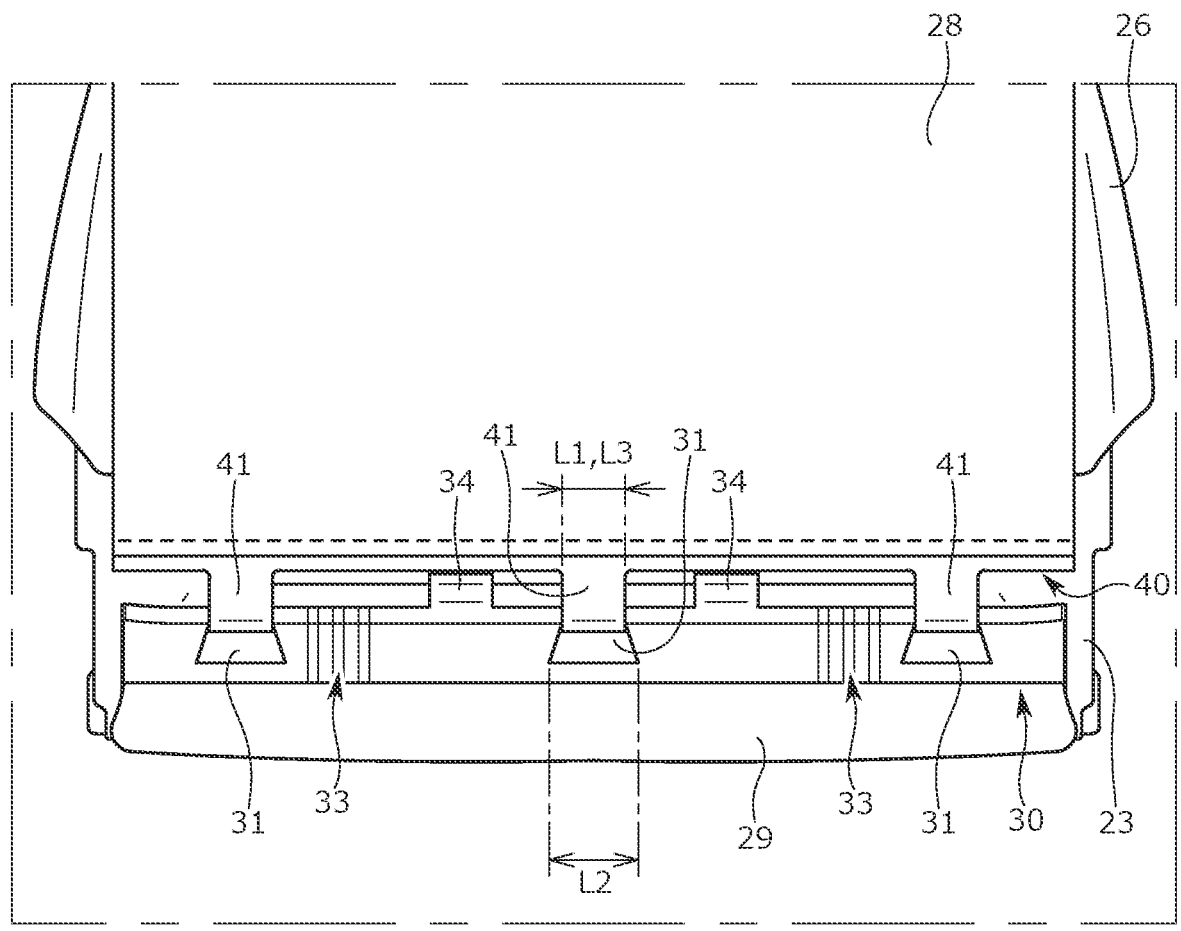
FIG. 12 is a diagram illustrating a state where a hooking member is hooked on an attachment member.
Figure 12:
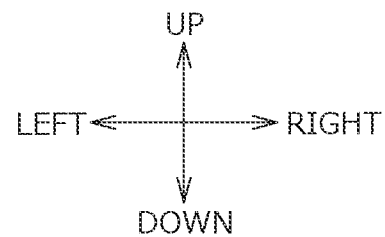

In addition, as illustrated in FIGS. 11 to 13, the hooking member 40 includes three hooking portions 41, and the three hooking portions 41 are disposed side by side in the direction that is parallel to the lower end portion 28a of the back surface skin material 28 (seat width direction). In addition, the attachment member 30 has three through holes 31 such that the three hooking portions 41 can be hooked in, and each opening portion is formed in a trapezoidal shape. The hooking portion 41 is not limited to three in number, and the number may be one or two or more. By the hooking member 40 being provided with a plurality of the hooking portions 41, the back surface skin material 28 is uniformly pulled in and the quality after the hooking member 40 is attached to the attachment member 30 is stable.

In addition, as illustrated in FIGS. 11 to 13, the attachment member 30 includes two holding portions 34, and the attachment member 30 is fixed to the upper end of the lower frame 23 by the two holding portions 34. The two holding portions 34 are disposed side by side in the direction that is parallel to the upper end of the lower frame 23. The holding portion 34 may be one or three or more in number. By providing a plurality of the holding portions 34, it is possible to suppress the attachment member 30 being inclined and shifted with respect to the lower frame 23 and the post-assembly quality of the conveyance seat is stable.

Figure 14:
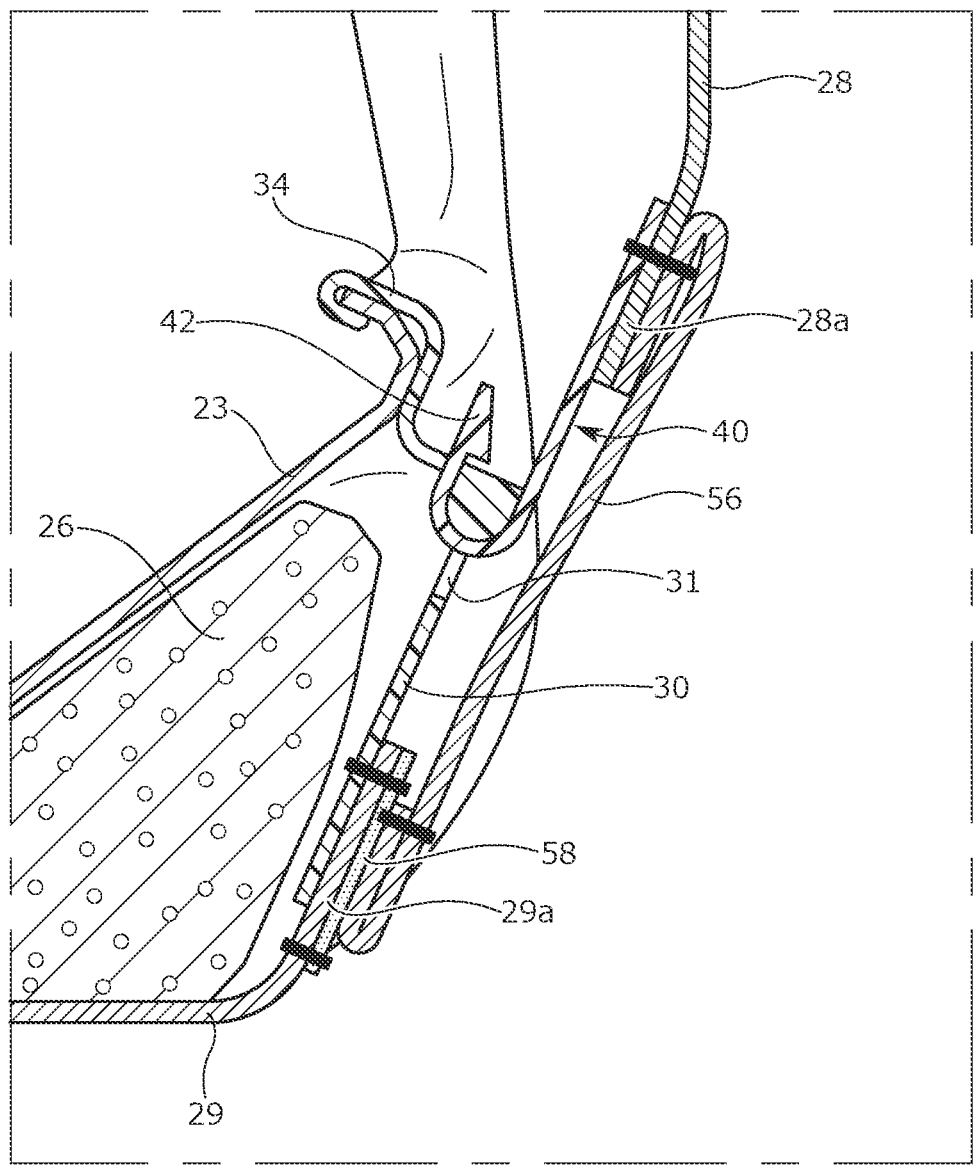
FIG. 14 is a cross-sectional view taken along line XIV-XIV of FIG. 13, illustrating the attachment member and the hooking member that are in a hooked state.
Figure 14:
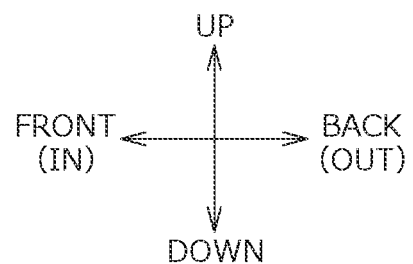

In addition, as illustrated in FIGS. 13 and 14, the upper end of the attachment member 30 is formed thicker than the other parts and configures a locking portion 32 locking the hooking portion 41 of the hooking member 40. By the locking portion 32 being thicker than the other parts, strength enhancement is achieved and damage attributable to being strongly pulled by the hooking portion 41 is suppressed.

The attachment member 30 is a long flat plate-shaped member as described above and is disposed so as to extend in the seat width direction. In addition, as illustrated in FIGS. 11 to 14, the attachment member 30 has a plurality of grooves 33 extending in the lateral direction (direction perpendicular to the longitudinal direction, up to down direction of the seat) in the outer surface facing the outside of the seat. The attachment member 30 is easily bent by the groove 33 being formed. Although the plurality of grooves 33 are formed in the outer surface of the attachment member 30 in the present embodiment, the plurality of grooves 33 may be formed in the inner surface of the attachment member 30 (surface facing the inside of the seat). By bending the attachment member 30 so as to be recessed to the inside of the vehicle seat SB, the hooking member 40 attached to the attachment member 30 is also bent and a recessed surface shape can be given to the back surface skin material 28.

The hooking portion 41 of the hooking member 40 has a claw portion 42 inserted into the through hole 31 as illustrated in FIGS. 10 and 13, and the claw portion 42 is disposed toward the inside of the seat back S2. By the claw portion 42 being disposed toward the inside of the seat back S2, the uneven part that appears on the outside surface of the hooking member 40 decreases. Accordingly, even with a flap 56 to be described later attached so as to cover the hooking member 40, the claw portion 42 is not directed to the outside, and thus the flap 56 becoming uneven is suppressed, the quality is stable, and the design is improved.

After the attachment member 30 is attached to the lower frame 23, the hooking member 40 is hooked and the back surface skin material 28 is stretched by hooking the hooking portion 41 to the through hole 31 of the attachment member 30. In this state, the attachment member 30 and the hooking member 40 are exposed to the outside as illustrated in FIG. 12. As illustrated in FIGS. 9 and 10, the flap 56 extending to the lower side of the seat is attached to the lower end portion 28a of the back surface skin material 28, and the flap 56 is capable of hiding the attachment member 30 and the hooking member 40. The lower end portion of the flap 56 is detachably attached to the lower end portion 29a of the front surface skin material 29 by a hook-and-loop fastener 58. It should be noted that a snap button or a clip may be used in addition to the hook-and-loop fastener 58 in attaching the flap 56.

<<Attachment by Hook-and-Loop Fastener>>

In the seat back S2 of the second embodiment, the upper end portion 28b of the back surface skin material 28 and the upper end portion 29b of the front surface skin material 29 are joined by sewing (hereinafter, the connected part is referred to as the joint portion 51). In the related art, this joint portion 51 is pulled inside the seat back S2 using one end of a trim cord, and the other end of the trim cord is fixed to the back frame 2 or the back pad 26 on the front side of the seat to stretch the back trim cover 27 on the back pad 26. In stretching the back trim cover 27, a worker attaches the trim cord attached to the joint portion 51 by reaching out to the back frame 2 or the back pad 26 on the front side of the seat back S2, and thus the work is complicated and it is difficult to mechanize this attachment work. In addition, in the back frame 2 illustrated in FIG. 2, the space between the suspension frame 25a and the connecting frame 25b is narrow and it is difficult to attach the trim cord by reaching out.

In the seat back S2 of the second embodiment, as illustrated in FIG. 10, a hook-and-loop fastener 50 is disposed in an end portion 26a on the upper side of the back pad 26, more specifically, at a part positioned on the upper side around the opening portion of the back pad 26 and the joint portion 51 can be detachably fixed to the end portion 26a of the back pad 26. Since a part of the back surface skin material 28 (more specifically, the joint portion 51) is fixed to the end portion 26a of the back pad 26 using the hook-and-loop fastener 50, the trim cord used for fixing in the related art is unnecessary and the number of components can be reduced. In addition, the attachment work is simplified as the joint portion 51 can be attached by the hook-and-loop fastener 50 provided in the end portion 26a of the back pad 26 without reaching out to the inner portion of the seat back S2. It should be noted that a snap button or a clip may be used to fix the joint portion 51.

<<Wire for Recessed Surface>>

As described above, the seat back S2 is formed in a recessed surface shape with its back surface recessed to the inside of the seat as illustrated in FIG. 9. As a result of the formation in the recessed surface shape, the leg space of a rear seat occupant can be further widened. In the related art, the back surface of the seat back S2 is given a recessed surface shape by pulling the attachment piece attached to the back surface of the back surface skin material 28 to the inside of the seat back S2 using a trim cord and fixing the piece to, for example, the frame.

In the vehicle seat SB of the second embodiment, a bow-shaped wire 52 is attached to the back surface of the back surface skin material 28 and, by the bow-shaped wire 52 pulling the middle part of the back surface skin material 28 to the inside of the seat back S2, the recessed surface shape of the back surface is realized.

More specifically, the wire 52 is formed longer than the length of the back surface skin material 28 in the seat width direction, and the bow shape of the wire 52 is maintained by both end portions 52*a* and 52*a* of the wire 52 being supported by support portions 54 and 54 provided on both side portions of the back surface skin material 28. The middle portion of the wire 52 and the middle portion of the back surface skin material 28 are connected by a coupling portion 53, and thus the middle portion of the back surface skin material 28 is pulled by the wire 52 and the back surface skin material 28 is given a recessed surface shape.

It is preferable to use a metallic or resinous wire that is, for example, rod-shaped, linear, or tubular as the wire 52. In addition, the diameter of the wire 52 is preferably 1 to 8 mm and more preferably 1.5 to 5 mm.

In addition, the back surface skin material 28 is made by coupling a plurality of skin pieces, and the wire 52 is disposed at the part where the skin pieces are coupled. By the wire 52 being disposed at the coupling part, the provision of the wire 52 on the back surface of the back surface skin material 28 becomes less noticeable and the design is improved.

The conveyance seat according to the second embodiment has been described above with reference to the drawings. In the above example, the hooking member 40 attached to the lower end portion of the back trim cover 27 covering the back pad 26 of the seat back S2 and the attachment member 30 fixing the hooking member 40 have been mainly described. However, this is an example and the present invention may be applied to the seat cushion S1. In other words, the opening portion formed in the attachment member may hook the hooking portion of the hooking member into a trapezoidal through hole with the attachment member disposed in the rear end portion of the cushion trim cover 17 that covers the cushion pad 16 of the seat cushion S1 and the hooking member attached to the rear end portion of a surface-covering skin material. In the case of application to the seat cushion S1 as well as the seat back S2, when the cushion trim cover 17 is attached to the cushion pad 16, strictness in terms of work is reduced and workability is improved.

REFERENCE SIGNS LIST

SA, SB: vehicle seat (conveyance seat)
S1: seat cushion (seat member)
S2: seat back (seat member)
S3: headrest
FA, FB: seat frame
1: cushion frame (frame)
11: pan frame
12: cushion side frame
13*a*: front pipe
13*b*: rear pipe
14: spring (pressure receiving portion)
   14*a*: pressure receiving plate
   14*c*, 14*d*: engagement hook
15*a*, 15*b*, 15*c*: claw portion
16: cushion pad (pad)
   16*a*: protruding portion
17: cushion trim cover (skin)
   17*a*: cover main body
   17*b*: end portion
   17*c*: attachment portion
   17*d*: wire member
18: extending portion
   18*b*: end portion
   18*c*: attachment portion
   18*d*: wire member
19: grip portion
C: tubular body
2: back frame (frame)
21: upper frame
   21*a*: headrest guide
22: back side frame
23: lower frame
24: pressure receiving plate
   25*a*: suspension frame
   25*b*: connecting frame
26: back pad (pad)
   26*a*: end portion
27: back trim cover (skin)
28: back surface skin material
   28*a*: lower end portion
   28*b*: upper end portion
29: front surface skin material
   29*a*: lower end portion
   29*b*: upper end portion
30: attachment member
31: through hole
   31*a*: upper side (first side)
   31*b*: lower side (second side)
32: locking portion
33: groove
34: holding portion
40: hooking member
41: hooking portion
42: claw portion
50, 58: hook-and-loop fastener
51: joint portion
52: wire
53: coupling portion
54: support portion
56: flap
57: line fastener
60: reclining mechanism
61: headiest pillar
V: gap
T0, T1: thickness

The invention claimed is:

1. A conveyance seat comprising two connected seat members, wherein
each of the two seat members includes a pad, a skin covering the pad, and a frame configuring a skeleton of the seat member,
the pad of one of the seat members has a protruding portion disposed between the frame of the one seat member and the other seat member at a part connected to the other seat member,
the skin of the one seat member has an extending portion extending by a predetermined distance from an end portion and covering a surface of the protruding portion and a grip portion gripping the protruding portion and covering a back surface of the protruding portion on a side connected to the other seat member, and
wherein both side portions in a seat width direction of the extending portion and both side portions in the seat width direction of the grip portion are joined, the extending portion and the grip portion form a tubular body, and the protruding portion is disposed through an inner portion of the tubular body.

2. The conveyance seat according to claim 1, wherein
the one seat member is a seat cushion where an occupant sits, and the other seat member is a seat back connected to a rear end portion of the seat cushion and receiving the occupant's back, and
the extending portion and the grip portion extend from a rear end portion of the skin of the seat cushion and cover the protruding portion of the seat cushion.

3. The conveyance seat according to claim 1, wherein a thickness of the extending portion is thinner than a thickness of the skin.

4. The conveyance seat according to claim 1, wherein
the frame has a pressure receiving portion supporting the pad, and
an attachment portion fixed to the pressure receiving portion is provided in the end portion of the skin.

5. The conveyance seat according to claim 4, wherein
a claw portion is formed on the frame or the pressure receiving portion, and
the attachment portion of the skin is hung on and fixed to the claw portion.

6. The conveyance seat according to claim 5, wherein the attachment portion has a wire member hung on a plurality of the claw portions formed on the frame or the pressure receiving portion.

7. The conveyance seat according to claim 1, wherein both side portions in the seat width direction of the extending portion and both side portions in the seat width direction of the grip portion are joined by sewing.

8. A method for manufacturing a conveyance seat including two connected seat members, each of the two seat members including a pad, a skin covering the pad, and a frame configuring a skeleton of the seat member, the pad of one of the seat members having a protruding portion at a part connected to the other seat member, and the skin of the one seat member having an extending portion extending by a predetermined distance from an end portion and covering a surface of the protruding portion and a grip portion gripping the protruding portion and covering a back surface of the protruding portion on a side connected to the other seat member, and both side portions in a seat width direction of the extending portion and both side portions in the seat width direction of the grip portion are joined, the extending portion and the grip portion form a tubular body, the conveyance seat manufacturing method comprising a step of passing the protruding portion between the frame of the one seat member and the other seat member in a state where the protruding portion is disposed through an inner portion of the tubular body and is covered with the extending portion and the grip portion.

9. The conveyance seat manufacturing method according to claim 8, wherein the frame has a pressure receiving portion supporting the pad, the conveyance seat manufacturing method further comprising a step of hanging an attachment portion provided in the end portion of the skin on a claw portion formed on the frame or the pressure receiving portion to fix the pad to the frame.

10. The conveyance seat manufacturing method according to claim 8, wherein both side portions in the seat width direction of the extending portion and both side portions in the seat width direction of the grip portion are joined by sewing.

* * * * *